(12) United States Patent
Date

(10) Patent No.: US 11,615,019 B2
(45) Date of Patent: Mar. 28, 2023

(54) NON-VOLATILE STORAGE DEVICE, HOST DEVICE, AND DATA STORAGE SYSTEM TO INCREASE DATA WRITE SPEED

(71) Applicant: SONY CORPORATION, Tokyo (JP)

(72) Inventor: Kazuyuki Date, Tokyo (JP)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 17/250,613

(22) PCT Filed: Aug. 7, 2019

(86) PCT No.: PCT/JP2019/031077
§ 371 (c)(1),
(2) Date: Feb. 10, 2021

(87) PCT Pub. No.: WO2020/039927
PCT Pub. Date: Feb. 27, 2020

(65) Prior Publication Data
US 2021/0326251 A1      Oct. 21, 2021

(30) Foreign Application Priority Data
Aug. 21, 2018   (JP) .............................. JP2018-154547

(51) Int. Cl.
*G06F 12/02*     (2006.01)
*G06F 12/0831*   (2016.01)
(Continued)

(52) U.S. Cl.
CPC ...... *G06F 12/0246* (2013.01); *G06F 12/0833* (2013.01); *G06F 12/0868* (2013.01); *G06F 12/0882* (2013.01); *G06F 2212/7201* (2013.01)

(58) Field of Classification Search
CPC ............ G06F 12/0246; G06F 12/0833; G06F 12/0868; G06F 12/0882; G06F 2212/7201; G06F 2212/7202; G06F 3/06; G06F 3/08
See application file for complete search history.

(56) References Cited

U.S. PATENT DOCUMENTS

| 6,327,639 B1 | 12/2001 | Asnaashari |
| 2010/0023721 A1 | 1/2010 | Ito |

(Continued)

FOREIGN PATENT DOCUMENTS

| JP | 2007-066326 A | 3/2007 |
| JP | 2010-026933 A | 2/2010 |
| JP | 2010-237907 A | 10/2010 |

OTHER PUBLICATIONS

International Search Report and Written Opinion of PCT Application No. PCT/JP2019/031077, dated Nov. 5, 2019, 09 pages of ISRWO.

*Primary Examiner* — Tasnima Matin
(74) *Attorney, Agent, or Firm* — Chip Law Group

(57) ABSTRACT

A non-volatile storage device according to an embodiment of the present technology includes a storage section and a calculation section. The storage section includes a plurality of block sections each including a plurality of page sections into which data can be written independent of each other, the plurality of block sections being capable of collectively deleting the data written in the plurality of page sections. The calculation section calculates, on the basis of information about write conditions of the plurality of page sections included in the storage section, candidate addresses that are candidates of logical addresses of the data to be written into the plurality of page sections.

15 Claims, 7 Drawing Sheets

(51) Int. Cl.
  *G06F 12/0868* (2016.01)
  *G06F 12/0882* (2016.01)

(56) References Cited

U.S. PATENT DOCUMENTS

2013/0179646 A1* 7/2013 Okubo .................... G06F 12/00
                                                    711/154
2016/0274792 A1* 9/2016 Ogawa .................... G06F 3/061
2017/0315730 A1   11/2017 Hashimoto et al.
2018/0373438 A1* 12/2018 Bennett ................ G06F 3/0652

* cited by examiner

| LBA | |
|---|---|
| 199 | Block #60, Page #1 |
| 200 | |
| 201 | |
| 202 | |
| 500 | Block #63, Page #5 |

| 499 | Block #80, Page #20 |
|---|---|
| 500 | |
| 501 | |
| 502 | |
| 509 | |
| 510 | Block #20, Page #5 |

FIG.11

| LBA | |
|---|---|
| 799 | Block #45, Page #3 |
| 800 | Block #30, Page #0 |
| 801 | Block #30, Page #1 |
| 802 | Block #30, Page #2 |
| 818 | Block #30, Page #18 |
| 819 | Block #30, Page #19 |
| 820 | Block #24, Page #0 |
| 1500 | Block #75, Page #20 |
| 1501 | Block #75, Page #21 |
| 1502 | Block #75, Page #22 |
| 1503 | Block #75, Page #23 |
| 1504 | Block #75, Page #24 |

FIG.12

Example of list at time when Size=380 is specified

| Head LBA | Size | Flag (0 = free) |
|---|---|---|
| 500 | 100 | 0 |
| 200 | 30 | 0 |
| 800 | 200 | 1 |
| 1500 | 50 | 1 |

44(44a) — rows 1-2; 44(44b) — rows 3-4; 50

NON-VOLATILE STORAGE DEVICE, HOST DEVICE, AND DATA STORAGE SYSTEM TO INCREASE DATA WRITE SPEED

CROSS REFERENCE TO RELATED APPLICATIONS

This application is a U.S. National Phase of International Patent Application No. PCT/JP2019/031077 filed on Aug. 7, 2019, which claims priority benefit of Japanese Patent Application No. JP 2018-154547 filed in the Japan Patent Office on Aug. 21, 2018. Each of the above-referenced applications is hereby incorporated herein by reference in its entirety.

TECHNICAL FIELD

The present technology relates to a non-volatile storage device, a host device, and a data storage system that are applicable to data recording processes.

BACKGROUND ART

Patent Literature 1 discloses a digital system for storing data. In this digital system, data is stored in a non-volatile memory device. For example, the data and its logical block addresses (LBAs) are supplied from a host to a controller. The LBAs are converted to physical block addresses (PBAs) that specify available storage areas in memory devices. The data is written into the storage areas specified by the PBAs. The LBAs and the PBAs are stored in predetermined buffers that are set in the memory devices. The host can make access to the written data, for example, by specifying the LBAs (refer, for example, to paragraph 33 on page 5 to paragraph 37 on page 6, and FIG. 1 of Patent Literature 1).

CITATION LIST

Patent Literature

Patent Literature 1: U.S. Pat. No. 6,327,639

DISCLOSURE OF INVENTION

Technical Problem

In recent years, there has been an increase in use of non-volatile storage devices, and there have been demands for a technology that enables an increase in data write speed.

In view of such circumstances, the present technology has been made to achieve an object to provide a non-volatile storage device, a host device, and a data storage system that enable the increase in data write speed.

Solution to Problem

In order to achieve the above-mentioned object, according to an embodiment of the present technology, there is provided a non-volatile storage device including a storage section and a calculation section.

The storage section includes a plurality of block sections each including a plurality of page sections into which data can be written independent of each other, the plurality of block sections being capable of collectively deleting the data written in the plurality of page sections.

The calculation section calculates, on the basis of information about write conditions of the plurality of page sections included in the storage section, candidate addresses that are candidates of logical addresses of the data to be written into the plurality of page sections.

In this non-volatile storage device, each of the plurality of block sections includes the plurality of page sections. The page sections are each capable of writing the data independent of each other, and the block sections are each capable of collectively deleting the data written in the plurality of page sections. From the information about the write conditions of these page sections, the candidate addresses that are the candidates of the logical addresses of the data that is going to be written are calculated. By using these candidate addresses, a write speed of the data can be increased.

The calculation section may calculate a range of the candidate addresses.

With this configuration, for example, the data can be written with use of sequential ones of the candidate addresses. As a result, efficiency of a procedure of writing the data can be increased.

The range of the candidate addresses, the range being calculated by the calculation section, may include a plurality of ranges of the candidate addresses.

With this configuration, ranges of the candidate addresses in accordance with a size of the data to be written can be prepared. For example, data in a sufficient size can be stably written.

The calculation section may calculate a head address of the range of the candidate addresses.

With this configuration, the range of the candidate addresses can be easily specified. As a result, the efficiency of the procedure of writing the data can be increased.

The calculation section may calculate a size of data that can be written in the range of the candidate addresses.

With this configuration, a size of the data at a time of using the range of the candidate addresses can be specified. As a result, the procedure of writing the data can be stably executed.

The information about the write conditions may include information in a conversion table that converts the logical addresses of the data written in the plurality of page sections to physical addresses of the plurality of page sections.

With this configuration, the candidate addresses can be easily calculated. As a result, the efficiency of the procedure of writing the data can be sufficiently increased.

The conversion table may include, as ones of the logical addresses, first addresses for which the physical addresses are not specified.

In this case, the calculation section may calculate the first addresses as the candidate addresses.

With this configuration, for example, unused ones of the logical addresses can be used as the candidate addresses. As a result, a speed of writing the data can be sufficiently increased.

The calculation section may calculate sequential ones of the first addresses as the candidate addresses.

With this configuration, sequential ones of the candidate addresses, at which high-speed write can be performed, can be prepared. As a result, the write speed can be increased, and at the same time, the efficiency of the write procedure can be increased.

The physical address may be an address that specifies the block section and the page section.

In this case, the calculation section may calculate, as the candidate addresses, second addresses being other ones of the logical addresses, the other ones of the logical addresses being converted to ones of the physical addresses, the ones of the physical addresses specifying a same one of the plurality of block sections.

For example, by writing the data in accordance with the second addresses, data written in the same one of the plurality of block sections is invalidated. With this configuration, efficiency of, for example, a process of generating free space can be increased.

The calculation section may calculate sequential ones of the second addresses as the candidate addresses.

With this configuration, the data written in the same one of the plurality of block sections is collectively invalidated. As a result, the efficiency of, for example, the process of generating the free space can be significantly increased.

The calculation section may calculate indices of a write speed at a time when the data to which the candidate addresses have been added is written.

With this configuration, the efficiency of the procedure of writing the data can be increased. As a result, high-speed write procedure can be executed.

The calculation section may calculate the indices of the write speed in accordance with presence/absence of ones of the physical addresses, the ones of the physical addresses corresponding to the candidate addresses.

With this configuration, the efficiency of the procedure of writing the data can be increased. As a result, the high-speed write procedure can be executed.

The non-volatile storage device may further include a communication section that performs data communication with a host device that makes access to the storage section.

In this case, the calculation section may notify the host device of the candidate addresses via the communication section.

With this configuration, the host device can generate, for example, write data with use of the candidate addresses. As a result, the speed of writing the data into the storage section can be sufficiently increased.

The communication section may receive a data size of the write data from the host device.

In this case, the calculation section may calculate a range of the candidate addresses on the basis of the received data size.

With this configuration, the ranges of the candidate addresses in accordance with the size of the data to be written can be prepared. As a result, the write data can be written at high speed and efficiently.

The calculation section may
generate notification information about the range of the candidate addresses, and
notify the host device of the generated notification information.

With this configuration, for example, the host device can properly generate the write data to which the candidate addresses have been added on the basis of the notification information.

The notification information may include an at least one of
a head address of the range of the candidate addresses,
a size of data that can be written in the range of the candidate addresses, or
an index of a write speed at a time when the data to which the candidate addresses have been added is written.

With this configuration, for example, the host device can preparatorily generate the write data to which the candidate addresses have been added on the basis of the notification information.

According to another embodiment of the present technology, there is provided a host device capable of making access to a non-volatile storage device, the host device including a communication section and a generating section.

The non-volatile storage device includes
a storage section including a plurality of block sections each including a plurality of page sections into which data can be written independent of each other, the plurality of block sections being capable of collectively deleting the data written in the plurality of page sections, and
a calculation section that calculates, on the basis of information about write conditions of the plurality of page sections included in the storage section, candidate addresses that are candidates of logical addresses of the data to be written into the plurality of page sections.

The communication section performs data communication for making access to the storage section of the non-volatile storage device.

The generating section
acquires the candidate addresses from the non-volatile storage device via the communication section, and
generates write data to which the acquired candidate addresses have been added.

According to a still another embodiment of the present technology, there is provided a data storage system including:
a non-volatile storage device; and
a host device capable of making access to the non-volatile storage device.

The non-volatile storage device includes
a storage section including a plurality of block sections each including a plurality of page sections into which data can be written independent of each other, the plurality of block sections being capable of collectively deleting the data written in the plurality of page sections, and
a calculation section that calculates, on the basis of information about write conditions of the plurality of page sections included in the storage section, candidate addresses that are candidates of logical addresses of the data to be written into the plurality of page sections.

The host device includes
a communication section that performs data communication for making access to the storage section of the non-volatile storage device, and
a generating section that
acquires the candidate addresses from the non-volatile storage device via the communication section, and
generates write data to which the acquired candidate addresses have been added.

Advantageous Effects of Invention

As described above, according to the present technology, the data write speed can be increased. Note that, the advantages disclosed herein are not necessarily limited to those described hereinabove, and not only these advantages but also advantages described hereinbelow can be obtained.

BRIEF DESCRIPTION OF DRAWINGS

FIG. 11 An explanatory schematic diagram showing an example of first candidate addresses.

FIG. 12 An explanatory schematic diagram showing an example of second candidate addresses.

MODE(S) FOR CARRYING OUT THE INVENTION

Hereinbelow, an embodiment according to the present technology is described with reference to the drawings.

[Configuration of Data Storage System]

Figure 1:
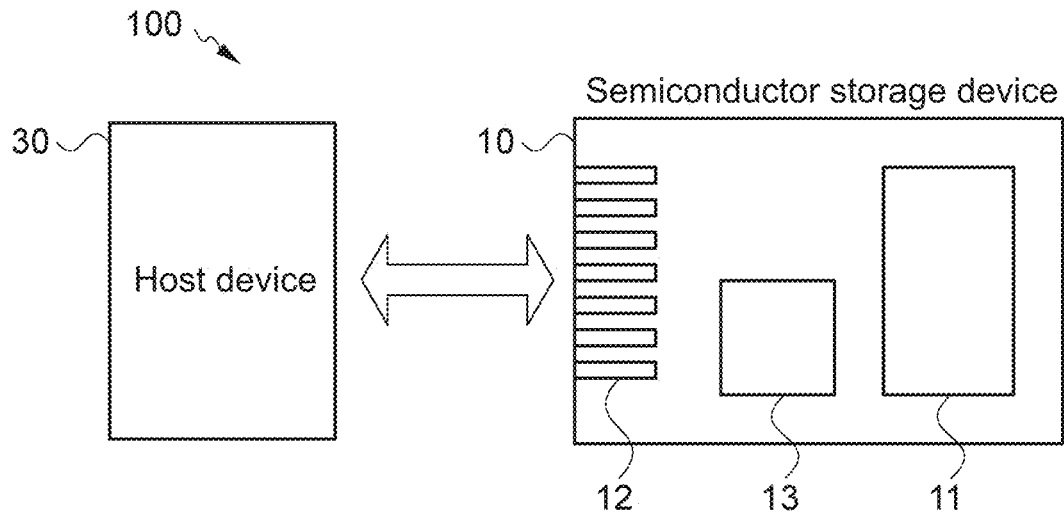
FIG. 1 A schematic diagram showing a configuration example of a data storage system according to an embodiment of the present technology.
Figure 2:
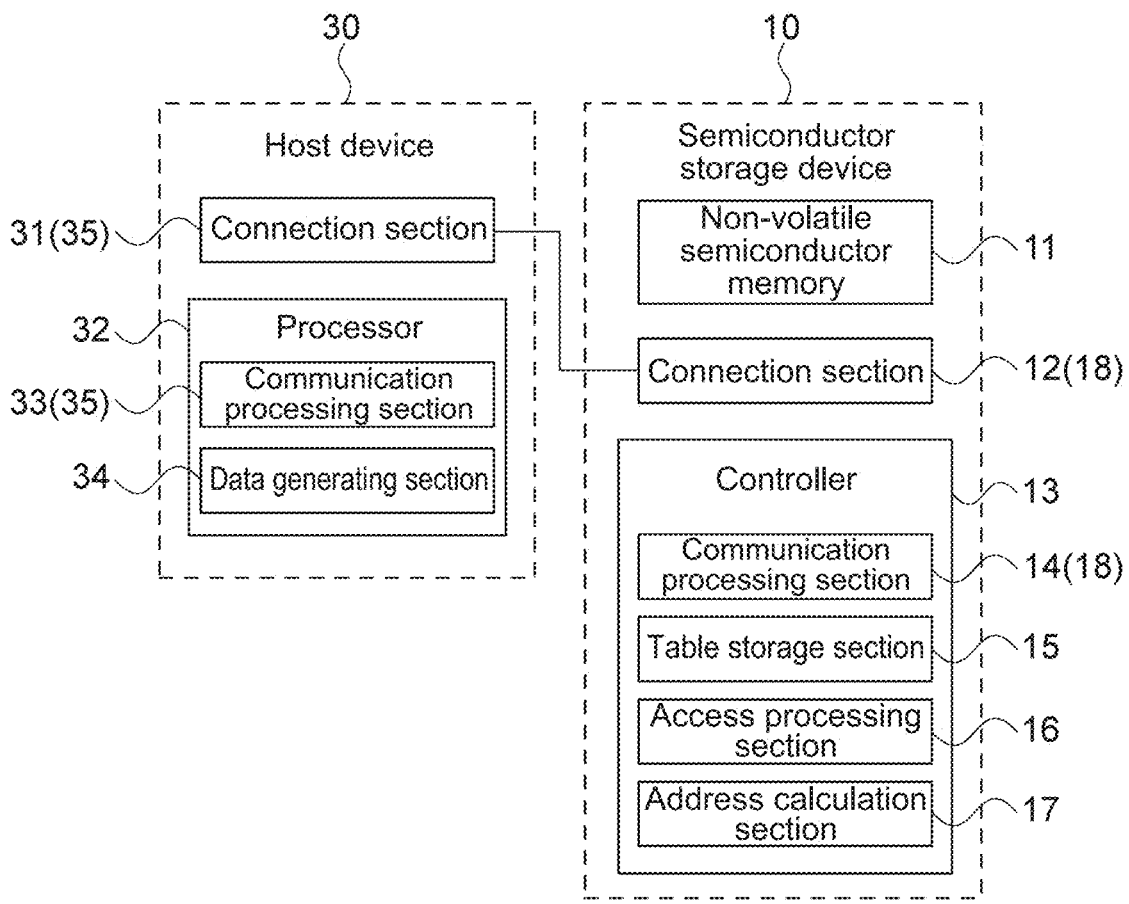
FIG. 2 A block diagram showing a configuration example of the data storage system shown in FIG. 1.

FIG. 1 is a schematic diagram showing a configuration example of a data storage system according to one of the embodiments of the present technology. FIG. 2 is a block diagram showing a configuration example of a data storage system 100 shown in FIG. 1. The data storage system 100 includes a semiconductor storage device 10 and a host device 30. The semiconductor storage device 10 of this embodiment corresponds to a non-volatile storage device.

In the data storage system 100, the host device 30 makes access to the semiconductor storage device 10. With this configuration, data write into the semiconductor storage device 10 and data read out of the semiconductor storage device 10 are performed. Note that, herein, the access encompasses R/W (Read/Write) of the data (information) in the semiconductor storage device 10.

Thus, for the host device 30, the semiconductor storage device 10 functions as an external storage device (auxiliary storage device) for storing data of various types. In addition, for the semiconductor storage device 10, the host device 30 is an external device that makes access to the stored data. For example, arbitrary devices that make access to the data stored in the semiconductor storage device 10 can be the host device 30. As examples of the host device 30, there may be mentioned a PC (Personal Computer), a server, imaging devices (such as a digital camera), media reproducing devices (such as a music player), mobile terminals (such as a smartphone and a tablet), various sensor devices, and the like. A type of the host device 30 is not limited.

The data to be stored in the semiconductor storage device 10 is digital data (electronic data) to be used in an arithmetic device installed in the host device 30. There is no limitation, for example, on the types of the data. For example, arbitrary data of, for example, voices, images, videos, numerical values, texts, documents, and application programs may be stored in the semiconductor storage device 10. Note that, herein, the data also encompasses fragmented data generated by dividing a data set.

As shown in FIG. 1, the semiconductor storage device 10 includes a non-volatile semiconductor memory 11, a connection section 12, and a controller 13. The non-volatile semiconductor memory 11, the connection section 12, and the controller 13 are connected as appropriate to each other via wires (not shown).

The non-volatile semiconductor memory 11 is typically a NAND flash memory (NAND Flash), which is configured to be capable of performing write and read of the data. Volume of the data that can be stored in the non-volatile semiconductor memory (storage capacity) and the like are not limited in particular, and may be set as appropriate.

Figure 3:
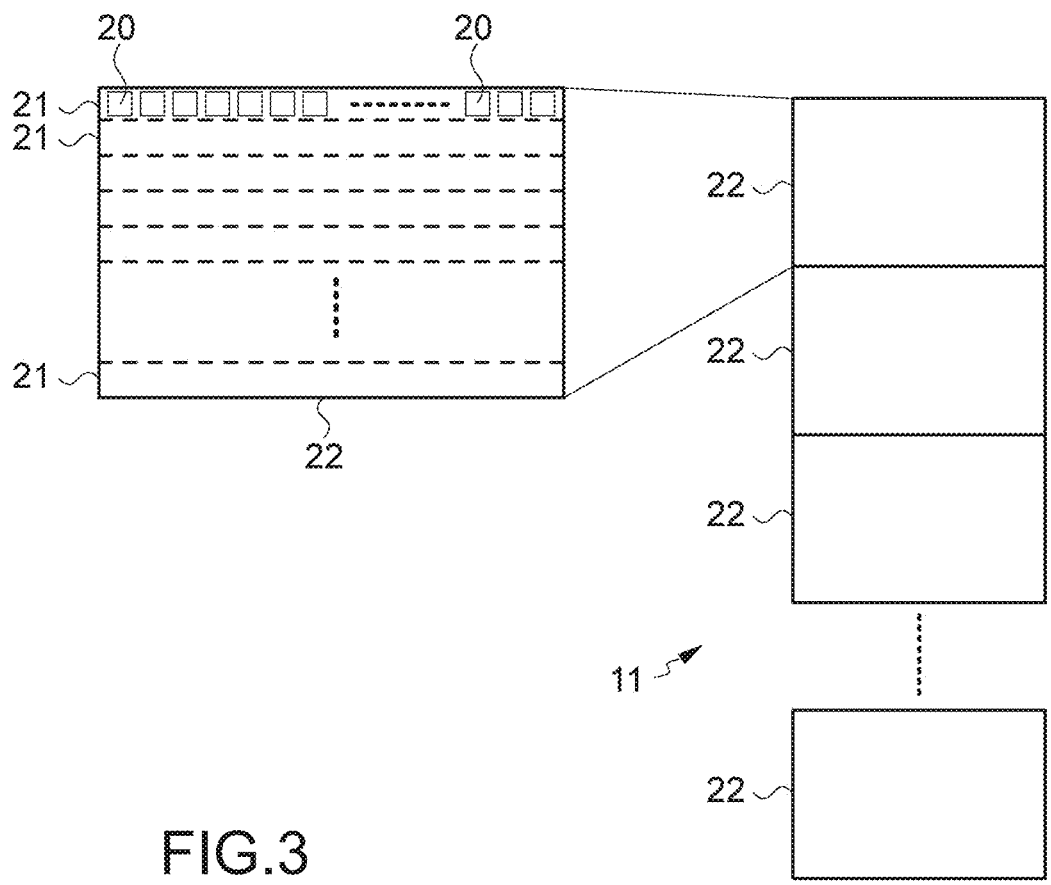
FIG. 3 A schematic diagram showing write units and delete units of a non-volatile semiconductor memory.

FIG. 3 is a schematic diagram showing write units and delete units of the non-volatile semiconductor memory 11. For example, a large number of cells 20 (memory cells) are provided on a substrate of the non-volatile semiconductor memory 11. The cells 20 each retain a predetermined amount of information by maintaining voltage levels different from each other. For example, in an SLC (Single Level Cell) format that maintains two voltage levels, the cells 20 each retain information (state) of 1 bit (0 or 1). In this case, the digital data is recorded by writing the information of 0 or 1 into each of the cells 20. Meanwhile, the digital data can be read out by reading out the state retained in each of the cells 20. There is no limitation, for example, on a format of recording the information into the cells 20. Specifically, other formats such as an MLC (Multiple Level Cell) format in which the cells 20 each retain information of 2 bits, and a TLC (Triple Level Cell) format in which the cells 20 each retain information of 3 bits may be employed as appropriate. The present technology is applicable irrespective of which of the formats of SLC, MLC, TLC, and the like is employed.

In the non-volatile semiconductor memory 11 such as the NAND flash memory, pages 21 in the data write units and blocks 22 in the data delete units are set. Note that, as shown in FIG. 3, a size (data size) of each of the pages 21 in the data write units and a size (data size) of each of the blocks 22 in the data delete units are different from each other.

The pages 21 each include the plurality of cells 20. In the non-volatile semiconductor memory 11, the data is written collectively into the plurality of cells 20 included in each of the pages 21. Note that, the data is not written independently into each of the cells 20. In such a way, the pages 21 are each a smallest unit (write unit) in which the data can be independently written. The pages 21 of this embodiment correspond to page sections. Note that, in a normal configuration, the data is recorded in the same format into each of the cells 20 included in one of the pages 21. Thus, for example, when the cells 20 include the ones each of which retains the information of 1 bit, the ones each of which retains the information of 2 bits, and the ones each of which retains the information of 3 bits, these ones are not allocated to the same one of the pages 21, but are allocated to different ones of the pages 21.

The number of the cells 20 included in each of the pages 21, that is, a size of the data to be recorded into each of the pages 21 may be set as appropriate. For example, the pages 21 are each set to include a data part of 512 bytes (4,096 bits) and a redundant part of 16 bytes (128 bits). In this case, write data of 512 bytes and the like are recorded in the data part. Note that, management information and the like are recorded into the redundant part. As a matter of course, the size, the configuration, and the like of each of the pages 21 are not limited thereto, and may be arbitrarily set.

The blocks 22 each include the plurality of pages 21. On the left-hand side in FIG. 3, the plurality of pages 21 included in one of the blocks 22 are schematically shown. In the non-volatile semiconductor memory 11, the data written in the plurality of pages 21 (cells 20) included in the one of the blocks 22 is collectively deleted. Note that, the data written in each of the pages 21 or in each of the cells 20 is not independently deleted. In such a way, the blocks 22 are each a smallest unit (delete unit) in which the data written in the pages 21 can be collectively deleted. The blocks 22 of this embodiment correspond to block sections.

The number of the pages 21 included in each of the blocks 22, that is, a data size of each of the blocks 22 may be set as appropriate. For example, the blocks 22 each include thirty-two pages 21. When, for example, the data part of each of the pages 21 has 512 bytes, the data size of each of the blocks is approximately 16 Kbytes. As a matter of course, the sizes, the configuration, and the like of each of the blocks 22 are not limited thereto, and may be arbitrarily set.

As shown on the right-hand side in FIG. 3, the non-volatile semiconductor memory 11 includes the plurality of blocks 22. More specifically, each of the plurality of blocks 22 of the non-volatile semiconductor memory 11 includes the plurality of pages 21 into each of which the data can be written independently, and are each capable of collectively deleting the data written in the plurality of pages 21. By deleting these blocks 22 as appropriate, for example, data can be rewritten, and free space can be secured. The non-volatile semiconductor memory 11 of this embodiment corresponds to a storage section.

Note that, since the blocks 22 are the delete units, only data in ones of the pages 21 in each of the blocks 22 cannot be directly rewritten. Specifically, in order to execute such a process, there is a need to execute, for example, processes such as temporarily evacuating the data in the block 22. This process is described below with reference, for example, to FIG. 7 and FIG. 8.

Referring back to FIG. 1, the connection section 12 is a connection terminal for establishing connection to the host device 30, which is configured according, for example, to a connection standard for the semiconductor storage device 10. The connection section 12 is arranged, for example, on an outside of a package of the semiconductor storage device 10, and is connected to a connection section 31 of the host device 30 described below.

A specific configuration of the connection section 12 is not limited. For example, connection terminals according to various standards, such as a memory stick, an SD card, a compact flash (trademark), USB (Universal Serial Bus), PCI (Peripheral Component Interconnect), and SATA (Serial Advanced Technology Attachment), may be used as that of the connection section 12 as appropriate. Alternatively, for example, connection terminals according to other arbitrary standards may be provided.

The controller 13 controls an operation of the semiconductor storage device 10 (non-volatile semiconductor memory 11). The controller 13 has hardware necessary for a computer, such as a CPU (Central Processing Unit), a RAM (Random Access Memory), a ROM (Read Only Memory), and the like. In order to implement, for example, an information processing method according to the present technology, for example, the CPU loads a predetermined program recorded in advance in the ROM to the RAM and executes this program.

A specific configuration of the controller 13 is not limited. For example, PLDs (Programmable Logic Devices) such as an FPGA (Field Programmable Gate Array), or other devices such as an ASIC (Application Specific Integrated Circuit) may be used.

As shown in FIG. 2, the controller 13 includes a communication processing section 24, a table storage section 15, an access processing section 16, and an address calculation section 17.

A communication processing section 14 executes communication processes for performing data communication with the host device 30. For example, the communication processing section 14 is configured as appropriate to be capable of communication processes according, for example, to the standards for the above-described connection section 12. Specifically, a dedicated circuit or the like that executes the communication processes may serve as the communication processing section 14.

The communication processing section 14 receives various processing commands such as a read command and a write command and, for example, write data via the connection section 12, the commands and the data being output from the host device 30. The received commands and the received data are output to the access processing section 16 and the address calculation section 17 described below. In addition, the communication processing section 14 transmits, to the host device 30 via the connection section 12, the data that is read out of the non-volatile semiconductor memory 11, calculation results from the address calculation section 17, and the like.

In such a way, in the semiconductor storage device 10, the connection section 12 and the communication processing section 14 serve as a host interface 18 (host I/F) that performs the data communication with the host device 30 that makes access to the non-volatile semiconductor memory 11. The host interface (connection section 12 and communication processing section 14) of this embodiment corresponds to a communication section of the non-volatile storage device. Hereinbelow, the data communication to be performed by the communication processing section 14 via the connection section 12 may be referred to as data communication to be performed via the host interface 18.

A table storage section 15 stores a table recording data write locations (logical/physical conversion table). For example, a storage device such as the RAM provided in the controller 13 serves as the table storage section 15. Note that, a specific configuration of the table storage section 15 is not limited. For example, the non-volatile semiconductor memory 11 or the like may serve as the table storage section 15.

Figure 4:
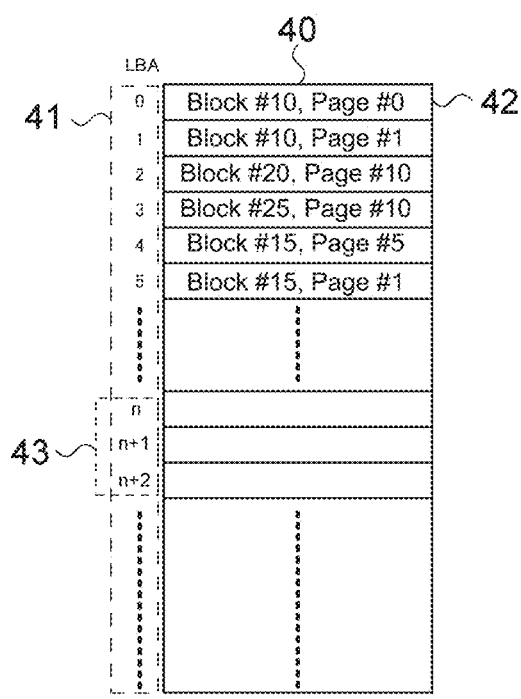
FIG. 4 A schematic diagram showing an example of a logical/physical conversion table.

FIG. 4 is a schematic diagram showing an example of the logical/physical conversion table. This logical/physical conversion table 40 is a table that converts logical addresses 41 of the data written in the pages 21 to physical addresses 42 of the pages 21. For example, by specifying the logical address 41 of data, a write location at which this data is actually written in (physical address 42 of page 21) is referred to. In this way, the specified data can be referred to. The logical/physical conversion table 40 of this embodiment corresponds to a conversion table.

For example, when the host device 30 writes data into the non-volatile semiconductor memory 11, a virtual address indicating a write location of this write-target data is added to this data. This virtual address is the logical address 41. By using the logical address 41, the host device 30 can process desired data without reference to the write location (physical address 42) or the like.

The logical address 41 is added as appropriate, for example, by the host device 30 to the write-target data (write data) according to a predetermined scheme such as LBA (Logical Block Addressing) or the like. There is no limitation, for example, on a method of adding the logical address 41, and arbitrary schemes may be employed as long as the virtual address can be specified.

As the logical addresses 41, for example, address values being serial numbers are used. In FIG. 4, the address values indicating the logical addresses 41 are represented by decimal numbers (0, 1, 2, 3, . . . ). Hereinbelow, the address values of the logical addresses 41 are referred to as LBAs, and their values are represented by the decimal numbers. Note that, in actual processes, the logical addresses 41 may be represented, for example, by hexadecimal numbers or the like. Content described hereinbelow is applicable to any of these cases.

The physical address 42 is an address indicating a location of the page 21. More specifically, the physical address is an address that specifies the block 22 and the page 21. In the example shown in FIG. 4, the physical address 42 of one of the pages 21 includes a number of the block 22 (block location) and a number of the one of the pages 21 in this block 22 (page location).

A scheme of the physical address 42, a method of representing the physical address 42, and the like are not limited. For example, arbitrary schemes, arbitrary representing methods, and the like by which the page 21 can be uniquely specified in the non-volatile semiconductor memory 11 may be employed. Hereinbelow, in order to make distinction from the reference symbols, the locations of the blocks 22 and the pages 21 are denoted by numbers with "#."

As shown in FIG. 4, the logical/physical conversion table 40 records a list of the logical addresses 41. The list of the logical addresses 41 is, for example, a list from a minimum value to a maximum value of the logical addresses 41 (serial numbers). In other words, the logical/physical conversion table 40 prepares a list of the logical addresses 41 to be used by the host device 30 or the like.

Specifically, in the example shown in FIG. 4, a physical address 42 "Block #10, Page #0" is recorded corresponding to a logical address 41 with an address value 0 (LBA=0). In other words, data with the logical address 41 of 0 is written in a zeroth page 21 of a tenth block 22. Similarly, also corresponding respectively to logical addresses 41 with address values 1 to 5 (LBA=1 to 5), physical addresses 42 indicating locations of pages 21 in which data with corresponding ones of address values has been written are recorded.

Note that, in the semiconductor storage device 10, the respective write locations (pages 21) of the data may be changed. In this case, in the logical/physical conversion table 40, the respective physical addresses 42 of the data are rewritten as appropriate when the pages 21 are changed. With this configuration, even when the write locations are changed, the host device 30 and the like can properly make access to desired data.

In addition, the logical/physical conversion table 40 includes, as ones of the logical addresses 41, empty addresses 43 for which the physical addresses 42 are not specified. The empty addresses 43 of this embodiment correspond to first addresses. For example, in FIG. 4, LBAs of n to n+2 do not have correspondingly recorded ones of the physical addresses 42. The empty addresses 43 refer to such logical addresses 41. In this case, data with the logical addresses 41 of LBAs of n, n+1, and n+2 has not been written as referable data in the non-volatile semiconductor memory 11.

As an example of the case where the logical address 41 is the empty address 43, a case where the data with the LBAs of n, n+1, and n+2 has not been originally written is conceivable. Specifically, when the semiconductor storage device 10 is in an initial state (for example, immediately after formatting), in such a case, an amount of written data is small, and a percentage of the empty addresses 43 in the list of the logical addresses 41 is high. In addition, for example, when the physical address 42 is deleted after data has been written, this data may be invalidated (for example, by a Trim command). In such a case, the logical address 41 added to the invalidated data is the empty address 43.

A specific configuration of the logical/physical conversion table 40 is not limited. For example, the logical/physical conversion table 40 may be configured as appropriate such that access can be properly made to the data written in the non-volatile semiconductor memory 11.

Referring back to FIG. 2, in response to the commands from the host device 30, the access processing section 16 executes various processes for making access to the non-volatile semiconductor memory 11. The commands from the host device 30 are, for example, the data read command, the data write command, a data delete command, and the like. In response to these commands, the access processing section 16 executes processes such as the data that is read from the non-volatile semiconductor memory 11, the data write into the non-volatile semiconductor memory 11, and the deletion.

In addition, the access processing section 16 secures the free space in which data is written. For example, the access processing section 16 searches an area (such as page 21 and block 22) into which data can be newly written. Alternatively, data is rewritten to generate a writable area, thereby securing the free space. In this way, data can be stably written. There is no limitation, for example, on a method of securing the free space.

Figure 6:
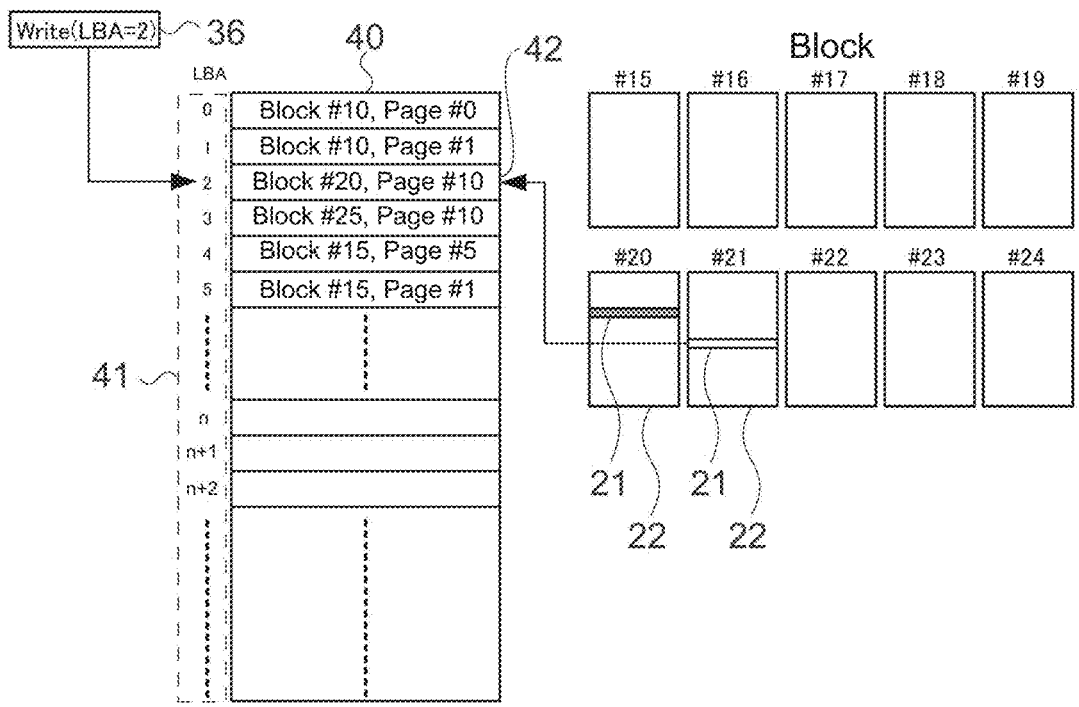
FIG. 6 A schematic diagram showing an example of a data write procedure.

Note that, in executing these processes, the access processing section 16 rewrites the physical address 42 in the logical/physical conversion table 40 as appropriate (refer to FIG. 6). Specifically, for example, when data is moved to another page 21, a physical address 42 corresponding to a logical address 41 of the target data is rewritten as another physical address 42 of the destination page 21.

The address calculation section 17 calculates, on the basis of information about write conditions of the pages 21 included in the non-volatile semiconductor memory 11, candidate addresses to be candidates of the logical address 41 of data to be written into the page 21. The address calculation section 17 of this embodiment corresponds to a calculation section.

The information about the write conditions is, for example, information such as that about in which of the pages 21 in the non-volatile semiconductor memory 11 which of data has been written. In other words, for example, this is also information such as that about which of the logical addresses 41 corresponds to which of the physical addresses 42. Such information can be easily acquired by using the logical/physical conversion table 40 described with reference to FIG. 4.

In this embodiment, the address calculation section 17 uses information in the logical/physical conversion table 40 as the information about the write conditions of the pages 21 included in the non-volatile semiconductor memory 11. In other words, the address calculation section 17 calculates the candidate addresses on the basis of the information in the logical/physical conversion table 40.

The candidate addresses are, for example, candidates of the logical address 41 to be added to data that is going to be written into the non-volatile semiconductor memory 11. For example, in the host device 30, according to a predetermined scheme, the logical address 41 is added to the write-target data (write data). The candidates of this logical address 41 to be added to this write data are calculated in accordance with the write conditions in the non-volatile semiconductor memory 11.

Specifically, the address calculation section 17 calculates a range of the candidate addresses. As described above, the logical addresses 41 used in this embodiment are the serial numbers. Thus, the range of the candidate addresses is a range of sequential ones of the logical addresses 41. The range of the candidate addresses can be defined, for example, by a head address (logical address 41 with the smallest address value) and a size of this range. Alternatively, for example, the minimum (head) address and the maximum (tail) address may be calculated as the range of the candidate addresses.

In this embodiment, the range of the candidate addresses to be calculated by the address calculation section 17 includes a plurality of ranges of the candidate addresses. Thus, for example, a plurality of partial lists of the logical addresses 41, each of which includes sequential ones of the logical addresses 41 in the list of the logical addresses 41 shown in FIG. 4, is calculated. Note that, the ranges of the candidate addresses (partial lists of the logical addresses 41) are calculated in a manner that the logical addresses 41 do not overlap with each other. With this configuration, risks such as that the candidate addresses, that is, the logical addresses 41 of the data that is going to be written overlap with each other is prevented.

In addition, the address calculation section 17 notifies the candidate addresses of the host device 30 via the host interface 18. For example, at a timing before the data is written, the candidate addresses are calculated, and the host device 30 is notified of these addresses. With this configuration, before the data is written, the host device 30 can select an appropriate one of the logical addresses 41 (candidate addresses) in accordance with the write conditions in the non-volatile semiconductor memory 11. A method of calculating the candidate addresses, information that the host device 30 is notified of, and the like are described in detail below.

The host device 30 is configured to be capable of making access to the semiconductor storage device 10. As shown in FIG. 2, the host device 30 includes the connection section 31 and a processor 32. The connection section 31 is a connection terminal for establishing connection to the semiconductor storage device 10. For example, the connection section 31 is configured as appropriate such that the connection section 12 of the semiconductor storage device 10 can be connected thereto. Note that, the connection section 31 need not necessarily be provided to a body of the host device 30, and, for example, connection adapters according to various connection standards, such as a card reader and the like, may be employed.

The processor 32 includes a communication processing section 33 and a data generating section 34. The communication processing section 33 executes communication processes for performing data communication with the semiconductor storage device 10. For example, the communication processing section 33 is configured as appropriate to be capable of communication processes according, for example, to the standards for the above-mentioned connection section 31.

The communication processing section 33 transmits various processing commands such as the read command and the write command, the write data, and the like to the semiconductor storage device 10 via the connection section 31. In addition, the communication processing section 33 receives, via the connection section 31, the data that is read out of the non-volatile semiconductor memory 11, the candidate addresses calculated by the address calculation section 17, and the like. Results of the reception are output as appropriate, for example, to a processing unit (not shown) and the data generating section 34 of the host device 30.

In such a way, in the semiconductor storage device 10, the connection section 31 and the communication processing section 33 serve as an external interface 35 (external I/F) that performs the data communication for making access to the non-volatile semiconductor memory 11. The external interface 35 (connection section 31 and communication processing section 33) of this embodiment corresponds to a communication section of the host device. Hereinbelow, the data communication to be performed by the communication processing section 33 via the connection section 31 may be referred to as data communication to be performed via the external interface 35.

The data generating section 34 generates the write data to be written into the semiconductor storage device 10. Specifically, according to the predetermined scheme (such as LBA scheme or the like), the logical address 41 for allowing a write-target data file to be written into the non-volatile semiconductor memory 11 is added to this data file. This data file to which the logical addresses 41 have been added is the write data.

In this embodiment, the data generating section 34 acquires the candidate addresses from the semiconductor storage device 10 via the external interface 35, and generates the write data to which the acquired candidate addresses have been added. The data generating section 34 of this embodiment corresponds to a generating section.

For example, the data generating section 34 transmits a request command that requests the candidate addresses (such as write notification command) to the semiconductor storage device 10. For example, in the semiconductor storage device 10, the address calculation section 17 calculates the plurality of ranges of the candidate addresses in response to the request command, and notifies these ranges of the host device 30.

The data generating section 34 selects, from all the ranges of the candidate addresses, a range including logical addresses 41 at which the write is actually performed, and generates the write data with use of the selected logical addresses 41 (candidate addresses). The generated write data is transmitted to the semiconductor storage device 10 via the external interface 35, and then written into the non-volatile semiconductor memory 11.

In such a way, in the host device 30, the write data is generated with use of the logical addresses 41 (candidate addresses) specified by the semiconductor storage device 10. In addition, the data to which the candidate addresses have been added is written into the semiconductor storage device 10 (non-volatile semiconductor memory 11). In this way, data write in accordance with the write conditions can be performed.

[Data Read Procedure and Data Write Procedure]

Now, a data read procedure, a data write procedure, and the like by the access processing section 16 of the semiconductor storage device 10 are described in detail.

Figure 5:
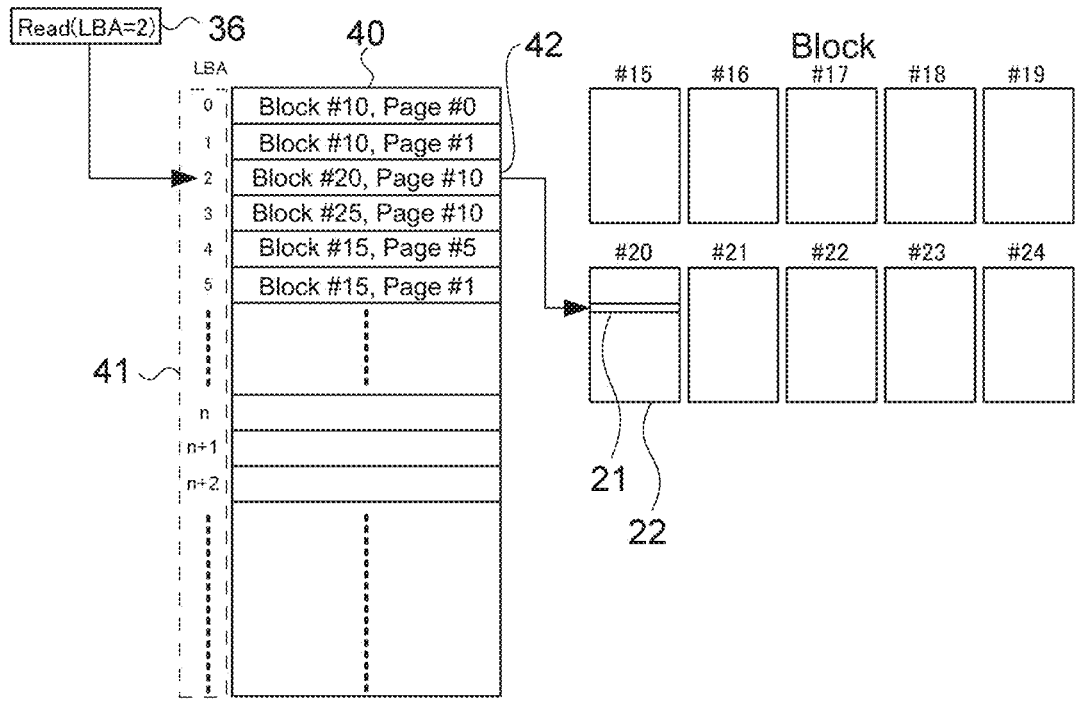
FIG. 5 A schematic diagram showing an example of a data read procedure.

FIG. 5 is a schematic diagram showing an example of the data read procedure. In FIG. 5, a command 36 for reading out data (read command) is output from the host device 30. The access processing section 16 receives the read command via the host interface 18, and executes the procedure of reading out the data written in the non-volatile semiconductor memory 11 (page 21).

In the example shown in FIG. 5, a request to read out data with an LBA of 2 is issued by the read command (Read (LBA=2)). The access processing section 16 searches the logical/physical conversion table 40 for a physical address 42 of a page 21 in which the data with the LBA of 2 has been written (Block #20, Page #10). In other words, in response to the data read command from the host device 30, the access processing section 16 converts the LBA of 2 to a location in the non-volatile semiconductor memory 11 with use of the logical/physical conversion table, at which valid data has been recorded.

In addition, the access processing section 16 makes access to a tenth page 21 in a twentieth block 22, and reads out data written in this page 21. The read-out data is transmitted to the host device 30 via the host interface 18. In this way, the host device 30 can acquire the data with the LBA of 2.

FIG. 6 is a schematic diagram showing an example of the data write procedure. In FIG. 6, another command 36 for writing data (write command) is output from the host device 30. The access processing section 16 receives the write command and the write data via the host interface 18, and executes the procedure of writing the received write data into the non-volatile semiconductor memory 11 (page 21).

In the example shown in FIG. 6, a request to write the data with the LBA of 2 is issued by the write command (Write (LBA=2)). Note that, in the non-volatile semiconductor memory 11, another data at the logical address 41 with the address value 2 (data with the LBA of 2) has already been written in the tenth page 21 in the twentieth block 22 (refer to FIG. 5).

The access processing section 16 writes the write data received together, for example, with the write command into free space secured in advance. In FIG. 6, the received write data corresponds to one of the pages 21, and is written into a twentieth page 21 in a twenty-first block 22.

In addition, the access processing section 16 makes access to the logical/physical conversion table 40, and updates a physical address 42 of the logical address (LBA=2) having been added to the write data to a physical address 42 of a page 21 into which the write data has been newly written (Block #21, Page #20). In other words, in response to the data write command from the host device 30, the access processing section 16 writes the data into the free space, and updates the logical/physical conversion table 40 including the logical address 41 specified by the command, whereby the logical/physical conversion table 40 includes a new write location.

With this configuration, the table showing the old write location of the logical address 41 (LBA=2) of the written data disappears. Thus, for example, when the data with the LBA of 2 is loaded next time, new data written at the updated physical address 42 (Block #21, Page #20) is loaded.

In addition, the old data written at the physical address before the update (Block #20, Page #10) is not loaded because the information about the logical address 41 of this data has been lost. In other words, the data written at the old write location (physical address 42 before the update) is invalid data. In FIG. 6, the invalidated page 21 (Block #20, Page #10) is schematically shown as a gray region.

In such a way, the logical/physical conversion table 40 is also a table showing locations of valid data to be specified by the logical addresses 41 (accessible data) in the non-volatile semiconductor memory 11. From another viewpoint, when the physical addresses 42 of data are not recorded in the logical/physical conversion table 40, this data is inaccessible invalid data.

Note that, the host device 30 does not necessarily need all the valid data in the logical/physical conversion table 40. For example, the valid data in the logical/physical conversion table 40 includes unnecessary data for the host device 30. In the semiconductor storage device 10, even the unnecessary data for the host device 30 remains stored as valid data until the host device 30 issues an instruction. Thus, the valid data is also data to be retained by the semiconductor storage device 10 under a state in which the data is accessible to the host device 30.

Figure 7:
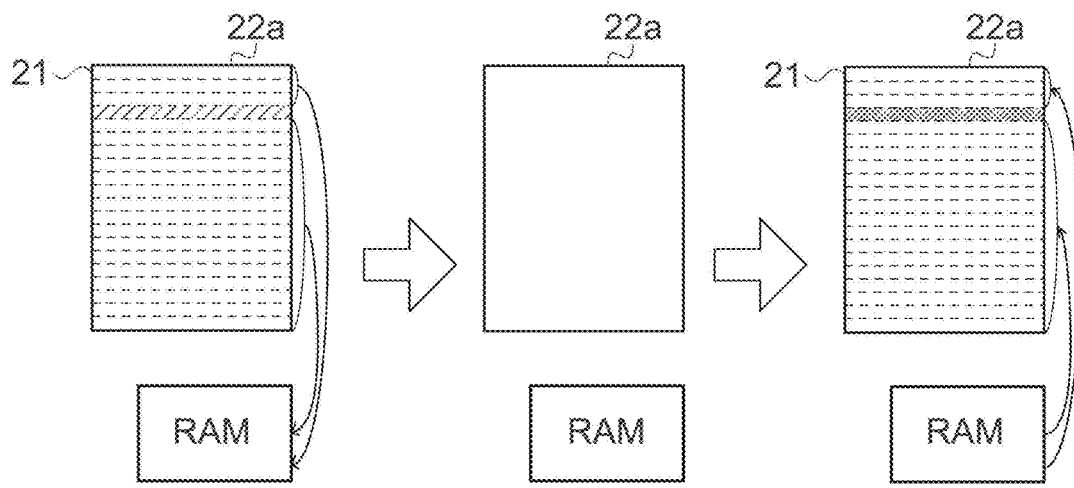
FIG. 7 A schematic diagram showing an example of a rewrite procedure using the same one of blocks.

FIG. 7 is a schematic diagram showing an example of a rewrite procedure using the same one of the blocks 22. In the rewrite procedure shown in FIG. 7, data written in a certain one of the blocks 22 (page 21) is updated and newly written into the same one of the blocks 22 (page 21).

As described above, in the non-volatile semiconductor memory 11 such as the NAND flash memory, data is deleted in the units of the blocks 22. Thus, processes such as rewrite of data only in ones of the pages 21 in the blocks 22 are not executed.

As shown on the left-hand side in FIG. 7, in a rewrite-target block 22a including a rewrite-target page 21 (shaded page 21 in FIG. 7), data of pages 21 not to be rewritten is temporarily evacuated, for example, to the RAM in the controller 13 or other blocks 22. For example, the data of the pages 21 not to be rewritten is backed up by being read out and written into another storage area (RAM in FIG. 7).

After the data of the pages 21 not to be rewritten has been evacuated, as shown at the center of FIG. 7, all the data in the rewrite-target block 22a is deleted. With this configuration, the rewrite-target block 22a enters a data writable state. As shown on the right-hand side in FIG. 7, the data evacuated to the other storage area (such as RAM) is read out and written into original write locations (pages 21) in the rewrite-target block 22a. At this time, new data is written into the rewrite-target page 21.

In such a way, in the rewrite procedure shown in FIG. 7, the data not to be rewritten is evacuated, and the evacuated data and the rewrite-target data are written together. By this technique, time periods necessary for evacuating and rewriting the data are prolonged. Thus, it may make it difficult for the host device 30 to perform R/W at a stable speed.

Figure 8:
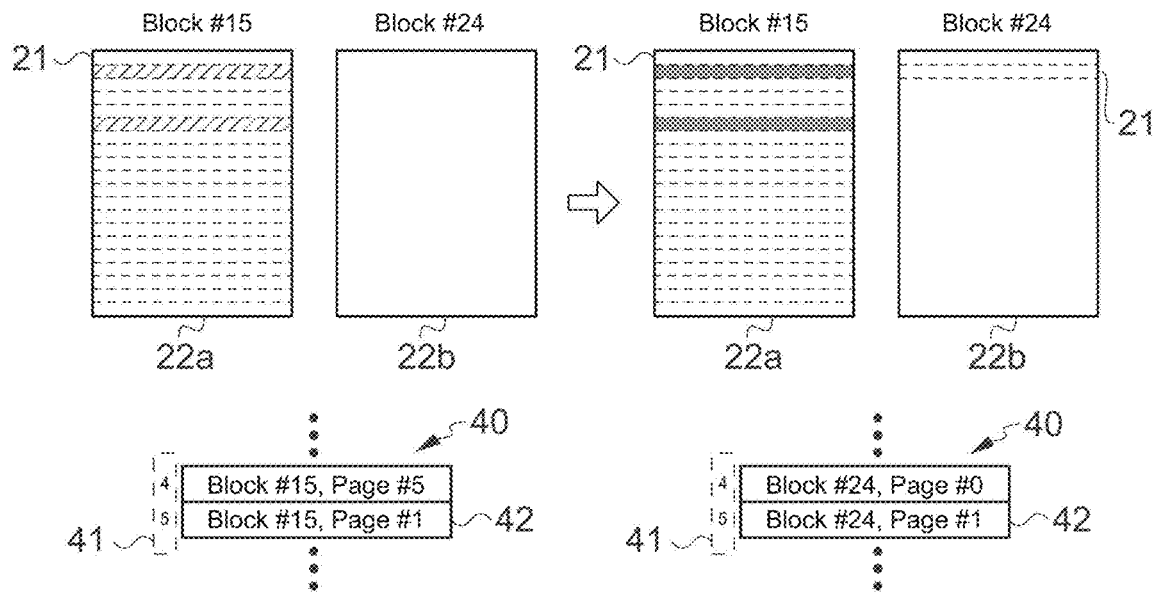
FIG. 8 A schematic diagram showing an example of a rewrite procedure using different ones of the blocks.

FIG. 8 is a schematic diagram showing an example of a rewrite procedure using different ones of the blocks 22. In the rewrite procedure shown in FIG. 8, data written in a certain one of the blocks 22 (pages 21) is updated and newly written into another one the blocks 22 (pages 21).

On the right-hand side in FIG. 8, the rewrite-target block 22a (Block #15), a writable block 22b (Block #24) including free space, and the logical/physical conversion table 40 before rewrite are schematically shown. In FIG. 8, data with the LBA of 5, which is written in Page #1 in Block #15, and data with the LBA of 4, which is written in Page #5 in Block #15, are rewritten.

For example, the host device 30 outputs a command that rewrites the data with the LBAs of 4 and 5. In this case, the access processing section 16 searches for the block 22b including writable pages 21 (Block #24), and secures free space for two pages 21. Note that, depending on a size of the data to be rewritten, or on a write condition of the block 22 that have been searched for, free space may be secured separately in a plurality of ones of the blocks 22.

As shown on the right-hand side in FIG. 8, by the access processing section 16, the new data received from the host device 30 (data with the LBA of 4 and 5) is written into the writable block 22b (Block #24). In addition, of the physical addresses 42 stored in the logical/physical conversion table 40, ones corresponding to the logical addresses 41 of the rewrite-target data are rewritten.

For example, in FIG. 8, a physical address 42 with the LBA of 4, that is, (Block #15, Page #5) is rewritten as (Block #24, Page #0). In addition, a physical address 42 with the LBA of 4, that is, (Block #15, Page #1) is rewritten as (Block #24, Page #1). As a result, the old data written in the old physical addresses 42 becomes invalid data.

In such a way, in the semiconductor storage device 10 using the non-volatile semiconductor memory 11, in many cases, at the time of rewrite, data is written into appropriate free space, and the logical/physical conversion table 40 retains respective write locations of the logical addresses 41 is rewritten, and the original data is invalidated. By this method, if there is free space, data can be rewritten with substantially no performance degradation.

Meanwhile, when the procedure shown in FIG. 8 is repeated, it is conceivable that pages 21 in which invalid data has been written (invalid areas) increase, and that free space decreases. For example, if such a state is left as it is, it is difficult to secure appropriate free space, and it may be difficult to perform data write.

In such a way, if the invalid data increases in an entirety of the system, there is a risk that new data cannot be written. As a countermeasure, in the semiconductor storage device 10, the access processing section 16 executes a procedure called garbage collection, which includes copying only valid data in the block 22 to free space before the free space is occupied, thereby generating new free space.

Figure 9:
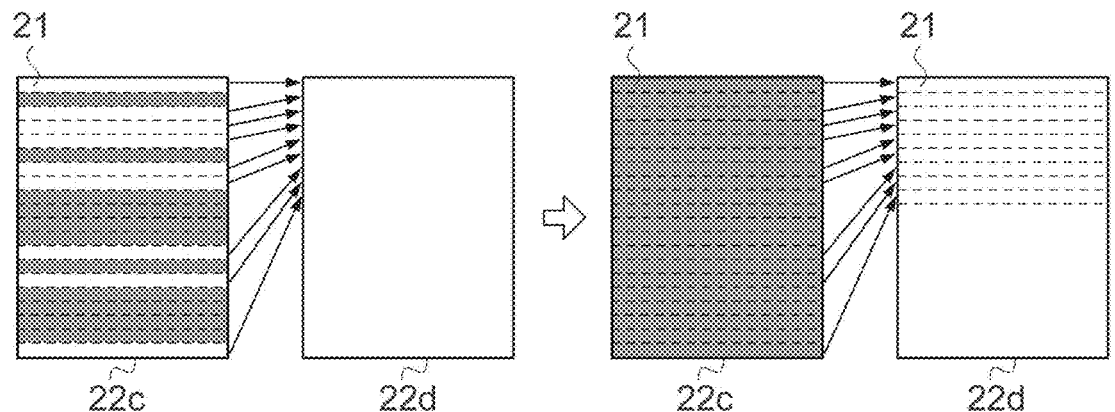
FIG. 9 A schematic diagram showing an example of a garbage collection procedure.

FIG. 9 is a schematic diagram showing an example of the garbage collection procedure. The garbage collection is, for example, a procedure including copying only valid data in one block 22 including invalid data to another block 22 before free space is occupied, and deleting the original one block 22.

On the right-hand side in FIG. 9, a copy-source block 22c before the garbage collection is performed and a copy-destination block 22d are schematically shown. The copy-source block 22c includes pages 21 in which valid data has been written, and other pages 21 in which invalid data has been written (gray pages 21). In addition, the copy-destination block 22c is a free block 22 into which all of these pages 21 can be written.

In the garbage collection, for example, the access processing section 16 reads out only the valid data included in the copy-source block 22c, and temporarily stores the data into the RAM or the like. As shown on the left-hand side in FIG. 9, the read-out valid data is written as appropriate into the copy-destination block 22d. Note that, this data is written, for example, in an ascending order of the numbers of the pages 21. Thus, in the copy-destination block 22, writable pages 21 with sequential numbers are left.

After the valid data has been copied, the physical addresses 42 corresponding to the logical addresses 41 of the copied data are rewritten, and the logical/physical conversion table 40 is updated. With this configuration, the valid data written in the copy-source block 22c loses information about its logical addresses, and becomes invalid data. As a result, the copy-source block 22c becomes a block 22 in which only the invalid data has been written.

The access processing section 16 deletes the data (invalid data) written in the copy-source block 22c. With this configuration, the copy-source block 22c becomes a writable block 22. As a result, in the entirety of the system, free space equivalent to a data amount of the invalid data that had been originally written in the copy-source block 22c is generated.

In such a way, by the garbage collection, since only the valid data is copied, the free space increases. In addition, it is desired that the garbage collection be performed on a block 22 including a large amount of invalid data and a small amount of valid data (copy-source block 22). For example, the more the invalid data included in the block 22 becomes, the more the free space is increased by the garbage collection. In addition, the less the valid data included in the block 22 becomes, the less frequently the copying by the garbage collection is performed. In this way, for example, influence on performance of other processes can be reduced.

Meanwhile, the larger the amount of the valid data to be copied becomes, the longer a time period of executing the copying process and the like becomes. As a result, a computing amount increases. In this case, by performing the garbage collection, influence such as that on performance of, for example, the other processes may be exerted.

Generally, in data write, devices that function as the host determine the logical addresses 41 irrespective of an internal situation of the device (semiconductor storage device 10). In this case, depending on the logical addresses 41 at which the write is performed, the garbage collection may be needed, and, for example, the frequency of the garbage collection may increase. As a result, it may be difficult to perform write at a stable speed.

[Procedure of Calculating Candidate Addresses]

Figure 10:
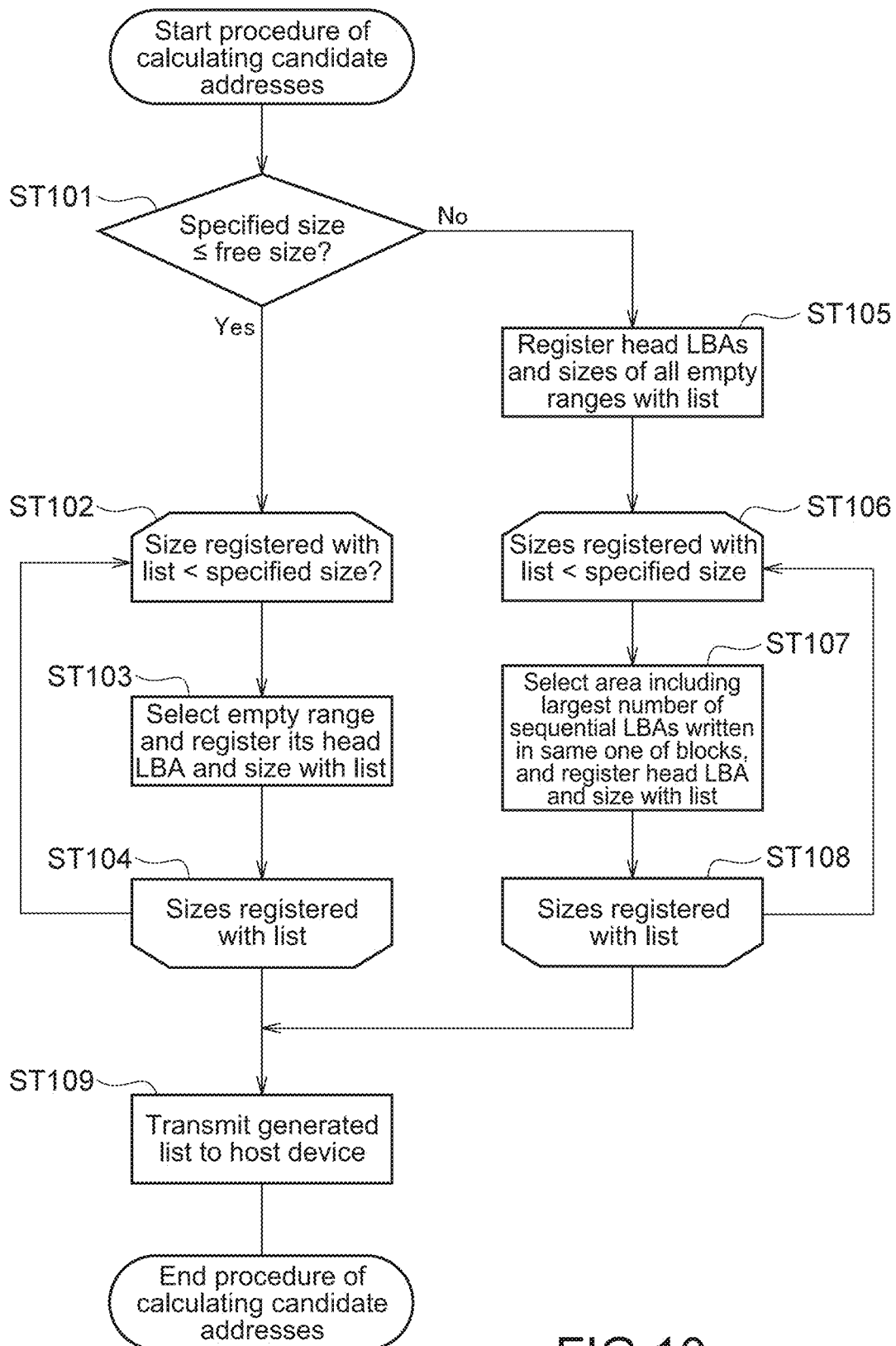
FIG. 10 A flowchart showing an example of a procedure of calculating candidate addresses.

FIG. 10 is a flowchart showing an example of a procedure of calculating the candidate addresses. In this embodiment, the address calculation section 17 calculates the candidate addresses that are candidates of the logical addresses 41 to be written into the pages 21.

The procedure shown in FIG. 10 is a procedure to be executed by the address calculation section 17 at the time when the host device 30 writes data. For example, the host device 30 outputs the write notification command that notifies of data write. The address calculation section 17 receives the write notification command via the host interface 18, and starts the procedure of calculating the candidate addresses.

Specifically, the host device 30 calculates a data data size (data volume) of write data that is going to be written. The calculated data size is output together with the write notification command to the semiconductor storage device 10 via the external interface 35.

In the semiconductor storage device 10, the host interface 18 receives the data size of the write data from the host device 30. Then, on the basis of the received data size, the address calculation section calculates the range of the candidate addresses. In such a way, in this embodiment, the range of the candidate addresses in accordance with the size of the data to be written is prepared. Now, with reference to FIG. 9, a procedure of calculating the range of the candidate addresses is described in detail.

Whether or not the data size of the write data (specified size), which is specified by the host device 30, is equal to or smaller than a size of free space (free size) in the non-volatile semiconductor memory 11 is determined (Step 101). The size of the free space in the non-volatile semiconductor memory 11 is, for example, a total data capacity of currently-writable ones of the pages 21. The size of the free space is calculated as appropriate by the access processing section 16. A method of calculating the size of the free space is not limited.

Note that, in Step 101, a list that records the candidate addresses is generated. In other words, a data area, parameters, and the like for recording the logical addresses 41 to be calculated as the candidate addresses are set as appropriate. Hereinbelow, the list of the candidate addresses may be abbreviated as a candidate list. The candidate list of this embodiment corresponds to notification information.

If the data size of the write data is smaller than the size of the free space (Yes in Step 101), a first loop process (Step 102 to Step 104) of calculating the candidate addresses for allowing the data to be written into the free space. Hereinafter, these candidate addresses to be calculated by the first loop process may be referred to as first candidate addresses.

In Step 102, whether or not a size registered with the candidate list is smaller than the specified size is determined. The size registered with the candidate list is a size of data that can be written with use of the range of the candidate addresses, which is registered with the candidate list. This size is described below. If the size registered with the candidate list is smaller than the specified size, Step 103 is executed to calculate the first candidate addresses.

FIG. 11 is an explanatory schematic diagram showing an example of the first candidate addresses. As described with reference to FIG. 2, the address calculation section 17 calculates candidate addresses 44 on the basis of the information in the logical/physical conversion table 40 (write conditions in the non-volatile semiconductor memory 11). FIG. 11 schematically shows another example of the logical/physical conversion table 40.

In Step 103, the address calculation section 17 calculates the empty addresses 43 as the candidate addresses 44. These empty addresses 43 correspond to first candidate addresses 44a. For example, of the logical addresses 41, ones that do not correspond to valid data in the semiconductor storage device 10 (that are not registered to correspond to write locations with logical/physical conversion table 40) are selected as the empty addresses 43. With this configuration, for example, unused ones of the logical addresses 41 (empty addresses 43) can be used as the candidate addresses 44.

In addition, in this embodiment, the address calculation section 17 calculates sequential ones of the empty addresses 43 as the candidate addresses 44. Specifically, in the logical/physical conversion table 40, an empty range in which the physical addresses 42 are not registered (range of the empty addresses 43) is selected as appropriate.

More specifically, in the example shown in FIG. 11, LBAs of 200 to 202 are the empty addresses 43 for which the physical addresses 42 are not registered. In addition, LBAs of 500 to 509 are also the empty addresses 43. As a matter of course, it is conceivable not only these empty addresses 43 but also other empty addresses are included. For example, the address calculation section 17 selects a range of the first candidate addresses 44a from these ranges of the empty addresses 43 (LBAs of 200 to 202, LBAs of 500 to 509, and the like) as appropriate.

For example, when new data is written with use of the empty addresses 43, this data is written into writable pages 21 being the free space. At this time, write locations of the pages 21 in which the new data has been written (new physical addresses 42) are registered for the empty addresses 43. Note that, since none of the empty addresses 43 has, for example, an old write location (old physical address 42) registered therefor, invalid data is not generated even when the new data is written.

In such a way, even when write is performed at the logical addresses 41 (empty addresses 43) that do not correspond to valid data in the non-volatile semiconductor memory 11 (device), invalid data does not increase. Thus, for example, blocks 22 including the invalid data are not generated, and hence the garbage collection is not induced. Therefore, by using the first candidate addresses 44a, a decrease in write speed by the garbage collection can be prevented, and a write procedure can be executed at sufficiently high speed. In other words, the range of the first candidate addresses 44a is also a range of the logical addresses 41, in which write can be performed at a most stable speed.

After the range of the first candidate addresses 44a has been selected, a head address of the range of the first candidate addresses 44a is calculated. For example, when the LBAs of 200 to 202 are selected, the head address (head LBA) is 200. Meanwhile, for example, when the LBAs of 500 to 509 are selected, the head address is 500. By these head addresses, for example, a location of the range of the first candidate addresses 44a in the logical/physical conversion table 40 can be indicated.

In addition, a size of data that can be written in the range of the first candidate addresses 44a is calculated. Herein, the size of the data that can be written in the range of the candidate addresses 44 is, for example, a data amount of data that can be written when all the logical addresses 41 included in the range of the candidate addresses 44 are used. As described with reference, for example, to FIG. 3, one logical address 41 is added to data to be written into one page 21. In addition, the size of the data that can be written into the one page 21 is preset.

Hereinbelow, for the sake of simplicity of description, the size of the data that can be written into the one page 21 is defined as 10 (Size=10). This data size indicates, for example, a relative data amount represented by arbitrary units. Note that, actually, the size of the writable data is set as appropriate in accordance with settings of, for example, the number of the cells 20 included in the page 21, or the cell range (data part) to be used for data.

For example, the range of the LBAs of 200 to 202 includes three logical addresses 41. Thus, the size of the writable data in the range of the LBA 200 to 202 is 30. Meanwhile, for example, the range of the LBAs of 500 to 509 includes ten logical addresses 41, and the size of the writable data therein is 100. In such a way, the size of the data that can be written in the range of the first candidate addresses 44a is calculated as a product of the number of addresses included in the range of the first candidate addresses 44a and the size of the data that can be written in the page 21.

Note that, an order of selecting the ranges of the first candidate addresses 44a (ranges of the empty addresses 43), a method of calculating the data size, and the like are not limited. For example, the ranges of the first candidate addresses 44a may be selected in a descending order of the sizes of the writable data. Alternatively, for example, the ranges of the first candidate addresses 44a may be selected in an ascending order of the logical addresses 41.

The information about the calculated ranges of the first candidate addresses 44a (such as the head addresses and the data sizes) is registered with the candidate list. In Step 104 in FIG. 10, a sum of the data sizes registered with the candidate list is calculated. For example, a data size of another range of other ones of the first candidate addresses 44a to be newly selected is added to a sum of data sizes that have been previously registered. The data sizes registered with a candidate list 50 are used in the determination in Step 102.

For example, if the size registered with the candidate list is equal to or larger than the specified size, the loop process is ended. In other words, if all write data can be written in the calculated range of the first candidate addresses 44a, the first loop process is ended. In such a way, as the first loop process, the processes are repeated to calculate the plurality of ranges of the first candidate addresses 44*a* until the specified size is satisfied.

Referring back to Step 101, if the specified size specified by the host device 30 is larger than the free size in the non-volatile semiconductor memory 11 (No in Step 101), all the ranges of the empty addresses 43 are selected (Step 105).

As described above, in the logical/physical conversion table 40, the physical addresses 42 are not registered for the empty addresses 43. Thus, for example, it is conceivable that the number of the empty addresses 43 corresponds to the number of the writable pages 21 to be the free space. In other words, a state in which there are no empty addresses 43 is also a state in which certain valid data has been written in all the pages 21.

For example, if the specified size is larger than the free size, even when all the empty addresses 43 are used, the data in the specified size cannot be completely written. Thus, in this embodiment, the ranges in which high-speed write can be performed, that is, the ranges of the empty addresses 43 (ranges of the first candidate addresses 44*a*) are registered with the candidate list, and then other ranges of the candidate addresses 44 are newly calculated.

In Step 105, for example, the logical/physical conversion table 40 is referred to, and the head addresses (head LBAs) of all the empty ranges, and the data sizes of all these ranges are registered with the candidate list. Thus, locations of currently available ranges of the first candidate addresses 44*a*, and data sizes to be secured with use of these locations are registered with the candidate list.

After all the ranges of the first candidate addresses 44*a* have been selected, a second loop process (Step 106 to Step 108) of calculating candidate addresses at which data rewrite is performed is executed. Hereinbelow, these candidate addresses to be calculated by the second loop process may be referred to as second candidate addresses.

In Step 106, whether or not the sizes registered with the candidate list are smaller than the specified size is determined. If the sizes registered with the candidate list are smaller than the specified size, Step 107 is executed to calculate the second candidate addresses.

FIG. 12 is an explanatory schematic diagram showing an example of the second candidate addresses. FIG. 12 schematically shows a still another example of the logical/physical conversion table 40.

In Step 107, the address calculation section 17 calculates the logical addresses 41 of data written in the same one of the blocks 22 (hereinafter, referred to as same-block specified addresses 45). In other words, the address calculation section 17 calculates, as the candidate addresses 44, the same-block specified addresses 45 being the logical addresses 41 to be converted to the physical addresses 42 that specify the same one of the blocks 22. These same-block specified addresses 45 correspond to second candidate addresses 44*b*. The same-block specified addresses 45 of this embodiment correspond to second addresses.

In addition, in this embodiment, the address calculation section 17 calculates sequential ones of the same-block specified addresses 45 as the candidate addresses 44. Specifically, in the logical/physical conversion table 40, a range of sequential ones of the logical addresses 41, which correspond to data written in the same one of the blocks 22 (range of the same-block specified addresses 45), is selected as appropriate.

More specifically, in the example shown in FIG. 12, LBAs of 800 to 819 are logical addresses 41 of data written in Block #30, which are sequential ones of the same-block specified addresses 45. In addition, LBAs of 1500 to 1504 are other sequential ones written in Block #75 of the same-block specified addresses 45. As a matter of course, it is conceivable that not only these sequential ones of the same-block specified addresses 45 but also still other sequential ones are included. For example, the address calculation section 17 selects a range of the first candidate addresses 44*a* from these ranges of the same-block specified addresses 45 (LBAs of 800 to 819, LBAs of 1500 to 1504, and the like) as appropriate.

In Step 107, an area including a largest number of sequential ones of the LBAs written in the same one of the blocks 22 is selected. In other words, the ranges of the same-block specified addresses 45 are selected in a descending order of sizes of the ranges. With this configuration, of the ranges of the candidate addresses 44, one that is adaptable to the size of write data can be prepared with a small number of loops.

Note that, it is desired that an order of the pages 21 in each of the logical addresses 41 in the block 22 be sequential. With this configuration, the rewrite procedure can be smoothly executed. Alternatively, the same-block specified addresses 45 may be arbitrary ones of the logical addresses 41, which are included in the same one of the blocks 22 and which have sequential address values.

For example, when new data is written with use of the same-block specified addresses 45, this data is written, for example, into writable pages 21 being the free space. At this time, write locations of the page 21 in which the new data has been written (new physical address 42) are registered for the same-block specified addresses 45.

In this case, in the block 22 specified by the same-block specified addresses 45, a large number of invalid data items are generated. For example, depending on the size of the data to be written, all the data in the block 22 may be invalidated by overwriting the sequential ones of the logical addresses 41. In this case, the block 22 in which all the data is invalidated can be deleted even without performing the garbage collection. In this way, the garbage collection itself can be prevented from being performed.

In addition, even when not all the data is invalidated for a reason that a range of the overwrite is small or other, a block 22 including a large number of invalid data items and a small number of valid data items is generated. Specifically, as described mainly with reference to FIG. 9, when there are a large number of invalid data items, an amount of free space to be generated by the garbage collection increases. Meanwhile, when there are a small number of valid data items, a processing amount itself of the garbage collection can be reduced.

In other words, by generating the block 22 including the large number of invalid data items, the free space can be efficiently increased even by single garbage collection, and influence to be exerted by the garbage collection onto the performance can be sufficiently suppressed. As a result, efficiency of, for example, the process of generating the free space can be significantly increased. In addition, even when the garbage collection is performed, high-speed data write can be performed without degradation of the performance.

After the ranges of the second candidate addresses 44*b* have been selected, a head address of each of the ranges of the second candidate addresses 44*b*, and a size of data that can be written in the ranges of the second candidate addresses 44*b* are calculated. For example, when the LBAs of 800 to 819 are selected, the head address (head LBA) is 800, and its data size is 200 (10×20). Meanwhile, for example, when LBAs of 1500 to 1502 are selected, the head address (head LBA) is 1500, and its data size is 50 (=10×5).

Note that, an order of selecting the ranges of the second candidate addresses 44*b* (ranges of the same-block specified addresses 45) and the like are not limited those in the above-described example. For example, the ranges of the second candidate addresses 44*b* may be selected, for example, in an order of the pages 21 in the blocks 22. Alternatively, the ranges of the second candidate addresses 44*b* may be selected in an ascending order of the logical addresses 41.

The information about the calculated ranges of the second candidate addresses 44*b* (such as the head addresses and the data sizes) is registered with the candidate list. In Step 108 in FIG. 10, a sum of the data sizes registered with the candidate list is calculated to be used in the determination in Step 106.

For example, if the sizes registered with the candidate list are equal to or larger than the specified size, the loop process is ended. In other words, if all write data can be written in a calculated range of the first candidate addresses 44*a* and a calculated range of the second candidate addresses 44*b*, the second loop process is ended. In such a way, as the second loop process, the processes are repeated to calculate the plurality of ranges of the second candidate addresses 44*b* until a data size that cannot be completely written only in the ranges of the first candidate addresses 44*a* is satisfied.

After the first loop process or the second loop process has been ended, the generated candidate list is transmitted to the host device 30 (Step 109). In such a way, in this embodiment, the address calculation section 17 generates the candidate list about the ranges of the candidate addresses 44, and notifies the host device 30 of the generated candidate list.

Figures 13, 14:
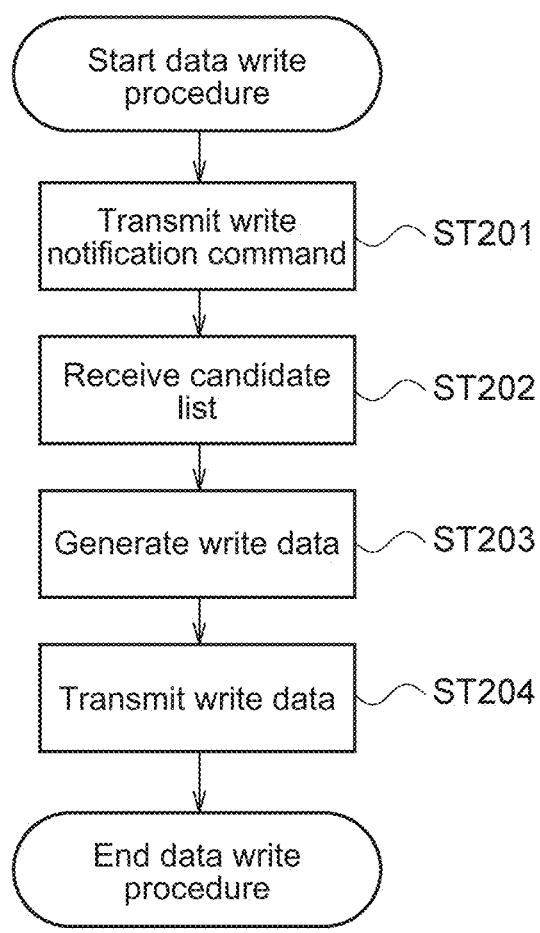
FIG. 13 A table showing an example of a candidate list.
FIG. 14 A flowchart showing an example of an operation of a host device.

FIG. 13 is a table showing an example of the candidate list. The candidate list 50 in the example shown in FIG. 13 is a list at a time when Size=380 is specified as write data by the host device 30. Note that, the candidate list 50 shown in FIG. 13 is a candidate list 50 generated by the second loop process.

As shown in FIG. 13, the candidate list 50 includes the head addresses (head LBAs) of the ranges of the candidate addresses 44, and the sizes of the data that can be written in the ranges of the candidate addresses 44 (Size).

In FIG. 13, as the ranges of the first candidate addresses 44*a*, the range of the empty addresses 43 corresponding to the LBAs of 500 to 509 (Head LBA=500 and Size=100), and the range of the empty addresses 43 corresponding to the LBAs of 200 to 202 (Head LBA=200 and Size=30), which are shown in FIG. 11, are registered. In addition, as the ranges of the second candidate addresses 44*b*, the range of the same-block specified addresses 45 corresponding to the LBAs of 800 to 819 (Head LBA=800 and Size=200), and the range of same-block specified addresses 45 corresponding to the LBAs of 1500 to 1504 (Head LBA=1500 and Size=50) are registered.

A total data size of these four ranges of the candidate addresses 44 is equal to the specified data size of Size=380 specified by the host device 30. Note that, depending on the sizes of the range of the sequential ones of the empty addresses 43 or the sequential ones of the same-block specified addresses 45, the ranges of the candidate addresses 44 to be calculated may include a range that corresponds to a data size larger than the specified size.

In addition, the candidate list 50 includes respective flags about the ranges of the candidate addresses 44 (Flag). The flags are calculated as appropriate, for example, at respective timings when the ranges of the candidate addresses 44 are registered with the candidate list 50 in Step 103, Step 105, and Step 107.

The flags are indices of a write speed in writing the data to which the candidate addresses 44 have been added. As described above, in writing data with use of the first candidate addresses 44*a*, the garbage collection is not induced, and high-speed write can be performed. Meanwhile, in writing data with use of the second candidate addresses 44*b*, the garbage collection may be induced or may not be induced.

In such a way, the first candidate addresses 44*a* and the second candidate addresses 44*b* are different from each other in stability of the write speed. Thus, by adding the flags to the candidate list 50, when the host device 30 is notified of the ranges of the candidate addresses 44, the host device can distinguish which of the ranges corresponds to which ones of the candidate addresses 44. In this way, efficiency of the data write procedure can be increased, and hence high-speed write procedure can be executed.

For example, the address calculation section 17 calculates the flags about the write speed in accordance with presence/absence of the physical addresses 42 corresponding to the candidate addresses 44. Specifically, as at the empty addresses 43, when corresponding physical addresses 42 are absent in the logical/physical conversion table 40, Flag=0 is calculated for a range of corresponding ones of the candidate addresses 44. In other words, Flag=0 is an index of write into unused ones of the logical addresses 41. Meanwhile, for example, as at the same-block specified addresses 45, when corresponding physical addresses 42 are present in the logical/physical conversion table 40, Flag=1 is calculated for a range of corresponding ones of the candidate addresses 44. In other words, Flag=1 is an index of write into used ones of the logical addresses 41.

Specifically, in FIG. 13, Flag=0 is registered for the ranges of the first candidate addresses 44*a* with the head LBAs of 500 and 200. Meanwhile, Flag=1 is registered for the ranges of the second candidate addresses 44*b* with the head LBAs of 800 and 1500. With this configuration, for example, the host device 30 can execute processes such as selecting the ranges of the candidate addresses 44 sequentially from ones in which high-speed write can be performed. Note that, a type, a calculation method, and the like of the flags are not limited. For example, arbitrary flags that enable notification of, for example, differences in write speed in using the candidate addresses 44 may be calculated and registered with the candidate list 50.

In such a way, in this embodiment, the address calculation section 17 transmits the candidate list including the head LBAs, the sizes, and the flags about the ranges of the candidate addresses 44 to the host device 30 via the host interface 18.

FIG. 14 is a flowchart showing an example of an operation of the host device. FIG. 14 shows an example of the write procedure at a time when the host device 30 writes data into the semiconductor storage device 10.

In the write procedure, the write notification command is transmitted to the semiconductor storage device 10 (Step 201). For example, the data generating section 34 calculates a data size of the data that the host device 30 is going to write, and generates the write notification command that notifies of the write of the data in this data size. The generated write-notification command is transmitted to the semiconductor storage device 10 via the external interface 35.

When the semiconductor storage device 10 receives the write notification command, the semiconductor storage device 10 executes the procedure of calculating the candidate addresses 44 as described with reference to FIG. 10. Then, the candidate list 50 about the calculated ranges of the candidate addresses 44 is transmitted to the host device 30 via the host interface 18.

The host device 30 receives the candidate list 50 calculated by the semiconductor storage device 10 (address calculation section 17) (Step 202). In the host device 30, the data generating section 34 generates the write data on the basis of the candidate list 50 (Step 203).

For example, the data generating section 34 selects the logical addresses 41 to be added to the write data from the ranges of the candidate addresses 44 included in the candidate list 50. Specifically, the logical addresses 41 included in the ranges of the first candidate addresses 44a are the logical addresses 41 not corresponding to valid data. In other words, for the host device 30, the first candidate addresses 44a are the unused logical addresses 41 in which data has not been written. Thus, the data generating section 34 preferentially selects, for example, the logical addresses 41 included in the ranges of the first candidate addresses 44a.

Meanwhile, for example, the logical addresses 41 included in the ranges of the second candidate addresses 44b are the logical addresses 41 of the accessible data to which the physical addresses 42 have been corresponded. The data generating section 34 determines, for example, whether or not the logical addresses 41 included in the ranges of the second candidate addresses 44b are logical addresses 41 of data that is necessary for the host device 30.

For example, when the logical addresses 41 of the data that is necessary for the various processes in the host device 30 are not included in the ranges of the second candidate addresses 44b, all the ranges of the second candidate addresses 44b are selected. Meanwhile, when the logical addresses 41 of the necessary data are included in the ranges of the second candidate addresses 44b, ones of the second candidate addresses 44b except the logical addresses 41 of the necessary data are selected. Thus, when the logical addresses 41 are selected from the ranges of the second candidate addresses 44b, for example, a part of the ranges of the second candidate addresses 44b may be selected.

Note that, when all the second candidate addresses 44b correspond to the logical addresses 41 of the necessary data, the second candidate addresses 44b are not selected. In this case, logical addresses of data that is unnecessary for the host device 30 are selected as appropriate.

The data generating section 34 generates the write data to which the logical addresses 41 selected on the basis of the candidate list 50 have been added. After the write data has been generated, this write data is transmitted to the semiconductor storage device 10 together with the write command (Step 204). Then, in the semiconductor storage device 10, the access processing section 16 writes, as appropriate respectively into the pages 21, the write data to which the candidate addresses 44 have been added.

In such a way, in this embodiment, by notifying the ranges of the logical addresses 41 at which high-speed write can be performed (ranges of the candidate addresses 44) from the semiconductor storage device to the host, the write data to which the logical addresses 41 at which high-speed write can be performed have been added is generated. With this configuration, for example, the garbage collection is prevented from being performed, and risks such as the performance degradation at the time of write are prevented. As a result, speed of write and the stability of write into the non-volatile semiconductor memory 11 can be sufficiently increased. In this way, semiconductor storage devices capable of stable and high-speed write can be provided.

As described hereinabove, in the semiconductor storage device 10 according to this embodiment, each of the plurality of blocks 22 includes the plurality of pages 21. The pages 21 are each capable of data write independent of each other, and the blocks 22 are each capable of collectively deleting the data written in the plurality of pages 21. From the information about the write conditions of these pages 21, the candidate addresses 44 that are the candidates of the logical addresses 41 of the data that is going to be written are calculated. By using these candidate addresses 44, the write speed of the data can be increased.

When the data is stored into the NAND flash memory, depending on how the data is written from the host, the garbage collection may be needed under the state in which a large number of the blocks 22 each including a small amount of invalid data are present. For example, processes such as randomly rewriting a part of a set of data to which sequential logical addresses have been added are frequently executed, the number of the blocks 22 each including the small amount of invalid data increases. In such a case, even when the garbage collection is performed on one of these blocks 22, free space does not significantly increase. As a result, the garbage collection needs to be performed on the plurality of ones of the blocks 22, and the influence on the performance may increase.

In this embodiment, in accordance with the write condition of each of the pages 21 in the non-volatile semiconductor memory 11, the ranges of the logical addresses 41 at which high-speed write can be performed (candidate addresses 44) are calculated. Further, the host device 30 generates the write data with use of these ranges of the candidate addresses 44. With this configuration, the data to be newly written uses the logical addresses 41 at which high-speed write can be performed. As a result, speed of write and its stability can be sufficiently secured.

Still further, the information in the logical/physical conversion table 40 is used as the information about the write conditions. With this configuration, for example, without sensing of, for example, the write conditions in the non-volatile semiconductor memory 11, appropriate ones of the logical addresses 41 can be easily calculated.

Yet further, as the candidate addresses 44, for example, the empty addresses 43 for which the physical addresses 42 are not specified, and the same-block specified addresses 45 being the logical addresses 41 of the data written in the same one of the blocks 22 are calculated. With this configuration, the performance degradation by the garbage collection can be suppressed, and high-speed and stable R/W can be performed.

Yet further, by using the candidate addresses 44, the garbage collection itself can be sufficiently prevented from being performed. Specifically, since frequency of performing the garbage collection can be reduced, the frequency of rewriting the NAND flash memory and the like can be reduced. As a result, a service life of the semiconductor storage device 10 can be extended. With this configuration, reliability of the semiconductor storage device 10 can be sufficiently increased.

Other Embodiments

The present technology is not limited to the embodiment described hereinabove, and various other embodiments may be implemented.

In the procedure shown in FIG. 10, as the candidate addresses, the logical addresses such as the empty addresses and the same-block specified addresses are calculated.

Alternatively, as the candidate addresses, arbitrary logical addresses at which high-speed write can be performed may be calculated.

Hereinabove, in calculating the candidate addresses, the information in the logical/physical conversion table is used as the information about the write conditions of the pages included in the non-volatile semiconductor memory.

Alternatively, in calculating the candidate addresses, arbitrary information that allows reference to the write conditions in the non-volatile semiconductor memory may be used.

Specifically, in calculating the candidate addresses, for example, other tables generated on the basis of the logical/physical conversion table may be used. More specifically, a table dedicated to the calculation of the candidate addresses may be generated. Still more specifically, by updating this dedicated table, the candidate addresses can be easily calculated. Alternatively, for example, a table including only extract of the logical addresses (empty addresses) to which the physical addresses have not been corresponded, a table generated to allow valid data and invalid data to be distinguished from each other at each of the write locations, and the like may be used as appropriate. In addition, the sensing in the non-volatile semiconductor memory may be performed so that the information about the write conditions therein is calculated as appropriate.

In the embodiment described hereinabove, the candidate addresses are calculated in response to the request command (write notification command) from the host device.

Alternatively, for example, even when there are no request commands, the procedure of calculating the candidate addresses may be executed as appropriate.

For example, the head addresses and the sizes of the ranges of the candidate addresses at which high-speed write can be performed are automatically calculated, for example, at a timing when the write procedure or the load procedure is not executed. Then, the information about the ranges of the calculated candidate addresses is disclosed accessibly to the host device or the like. For example, with reference to the disclosed information about the ranges of the calculated candidate addresses as appropriate, the host device can acquire information about the candidate addresses at which high-speed write can be performed. Such a configuration and the like may be employed.

In the configuration described hereinabove, the host device and the semiconductor storage device are connected directly to each other via their respective connection sections. Alternatively, the host device and the semiconductor storage device may be connected to each other, for example, via wireless communication. Specifically, in this case, an interface according to a standard such as Wireless LAN, Bluetooth (trademark), NFC (Near Field Communication), or WUSB (Wireless USB) is provided as appropriate. In such a way, the present technology is applicable irrespective of how the host device and the semiconductor storage device are connected to each other.

At least two of the features described hereinabove according to the present technology may be combined with each other. In other words, various features described respectively in the embodiments may be arbitrarily combined with each other regardless of all these embodiments. Further, the various advantages described hereinabove are merely examples, and hence are not limited thereto. Thus, other advantages may be additionally obtained.

Note that, the present technology may also employ the following configurations.

(1) A non-volatile storage device, including:
a storage section including a plurality of block sections each including a plurality of page sections into which data can be written independent of each other, the plurality of block sections being capable of collectively deleting the data written in the plurality of page sections; and
a calculation section that calculates, on the basis of information about write conditions of the plurality of page sections included in the storage section, candidate addresses that are candidates of logical addresses of the data to be written into the plurality of page sections.

(2) The non-volatile storage device according to (1), in which
the calculation section calculates a range of the candidate addresses.

(3) The non-volatile storage device according to (2), in which
the calculation section calculates a plurality of ranges of the candidate addresses.

(4) The non-volatile storage device according to (2) or (3), in which
the calculation section calculates a head address of the range of the candidate addresses.

(5) The non-volatile storage device according to any one of (2) to (4), in which
the calculation section calculates a size of data that can be written in the range of the candidate addresses.

(6) The non-volatile storage device according to any one of (1) to (5), in which
the information about the write conditions includes information in a conversion table that converts the logical addresses of the data written in the plurality of page sections to physical addresses of the plurality of page sections.

(7) The non-volatile storage device according to (6), in which
the conversion table includes, as ones of the logical addresses, first addresses for which the physical addresses are not specified, and
the calculation section calculates the first addresses as the candidate addresses.

(8) The non-volatile storage device according to (7), in which
the calculation section calculates sequential ones of the first addresses as the candidate addresses.

(9) The non-volatile storage device according to any one of (6) to (8), in which
the physical address is an address that specifies the block section and the page section, and
the calculation section calculates, as the candidate addresses, second addresses being other ones of the logical addresses, the other ones of the logical addresses being converted to ones of the physical addresses, the ones of the physical addresses specifying a same one of the plurality of block sections.

(10) The non-volatile storage device according to (9), in which
the calculation section calculates sequential ones of the second addresses as the candidate addresses.

(11) The non-volatile storage device according to any one of (1) to (10), in which
the calculation section calculates indices of a write speed at a time when the data to which the candidate addresses have been added is written.

(12) The non-volatile storage device according to (11), in which
the calculation section calculates the indices of the write speed in accordance with presence/absence of ones of the physical addresses, the ones of the physical addresses corresponding to the candidate addresses.
(13) The non-volatile storage device according to any one of (1) to (12), further including
a communication section that performs data communication with a host device that makes access to the storage section, in which
the calculation section notifies the host device of the candidate addresses via the communication section.
(14) The non-volatile storage device according to (13), in which
the communication section receives a data size of write data from the host device, and the calculation section calculates a range of the candidate addresses on the basis of the received data size.
(15) The non-volatile storage device according to (14), in which
the calculation section
generates notification information about the range of the candidate addresses, and
notifies the host device of the generated notification information.
(16) The non-volatile storage device according (15), in which
the notification information includes an at least one of
a head address of the range of the candidate addresses,
a size of data that can be written in the range of the candidate addresses, or
an index of a write speed at a time when the data to which the candidate addresses have been added is written.
(17) A host device capable of making access to a non-volatile storage device,
the non-volatile storage device including
a storage section including a plurality of block sections each including a plurality of page sections into which data can be written independent of each other, the plurality of block sections being capable of collectively deleting the data written in the plurality of page sections, and
a calculation section that calculates, on the basis of information about write conditions of the plurality of page sections included in the storage section, candidate addresses that are candidates of logical addresses of the data to be written into the plurality of page sections,
the host device including:
a communication section that performs data communication for making access to the storage section of the non-volatile storage device; and
a generating section that
acquires the candidate addresses from the non-volatile storage device via the communication section, and
generates write data to which the acquired candidate addresses have been added.
(18) A data storage system, including:
a non-volatile storage device; and
a host device capable of making access to the non-volatile storage device,
the non-volatile storage device including
a storage section including a plurality of block sections each including a plurality of page sections into which data can be written independent of each other, the plurality of block sections being capable of collectively deleting the data written in the plurality of page sections, and
a calculation section that calculates, on the basis of information about write conditions of the plurality of page sections included in the storage section, candidate addresses that are candidates of logical addresses of the data to be written into the plurality of page sections,
the host device including
a communication section that performs data communication for making access to the storage section of the non-volatile storage device, and
a generating section that
acquires the candidate addresses from the non-volatile storage device via the communication section, and
generates write data to which the acquired candidate addresses have been added.

Reference Signs List 10 semiconductor storage device
11 non-volatile semiconductor memory
15 table storage section
17 address calculation section
18 host interface
21 page
22, 22a to d block
30 host device
34 data generating section
35 external interface
40 logical/physical conversion table
41 logical address
42 physical address
43 empty address
44 candidate address
45 same-block specified address
50 candidate list
100 data storage system

The invention claimed is:
1. A non-volatile storage device, comprising:
a storage section including a plurality of block sections, wherein
each of the plurality of block sections includes a plurality of page sections,
data is independently writable into each of the plurality of page sections, and
the data written in the plurality of page sections is collectively deletable in each of the plurality of block sections;
a communication section configured to receive, from a host device, a data size associated with write data; and
a calculation section configured to:
determine that the received data size is greater or smaller than a size of free space in the non-volatile storage device;
calculate a plurality of first addresses as candidate addresses based on the determination that the received data size is smaller than the size of free space, wherein
the candidate addresses are candidates of logical addresses for the write data to be written into the plurality of page sections,
the plurality of first addresses corresponds to unused logical addresses that have physical addresses unspecified in a conversion table, and
the conversion table is a table that converts the logical addresses of the data written in the plural- ity of page sections to the physical addresses of the plurality of page sections; and calculate each of the plurality of first addresses and a plurality of second addresses as the candidate addresses based on the determination that the received data size is greater than the size of free space, wherein the plurality of second addresses are the logical addresses that correspond to a same block section of the plurality of block sections.

2. The non-volatile storage device according to claim 1, wherein the calculation section is further configured to calculate each of the plurality of first addresses and the plurality of second addresses as a range of the candidate addresses.

3. The non-volatile storage device according to claim 2, wherein the calculation section is further configured to calculate each of the plurality of first addresses and the plurality of second addresses as a plurality of ranges of the candidate addresses.

4. The non-volatile storage device according to claim 2, wherein the calculation section is further configured to calculate a head address of the range of the candidate addresses.

5. The non-volatile storage device according to claim 2, wherein the calculation section is further configured to calculate a size of data that is writable into the range of the candidate addresses.

6. The non-volatile storage device according to claim 1, wherein the calculation section is further configured to calculate sequential logical addresses as the plurality of first addresses.

7. The non-volatile storage device according to claim 1, wherein each of the physical addresses is an address that specifies for each of the logical addresses, a corresponding block section of the plurality of block sections and a corresponding page section of the plurality of page sections.

8. The non-volatile storage device according to claim 1, wherein the calculation section is further configured to calculate sequential logical addresses as the plurality of second addresses.

9. The non-volatile storage device according to claim 1, wherein the calculation section is further configured to calculate indices of a write speed, and the write speed indicates a speed at a time when the write data is written to the candidate addresses.

10. The non-volatile storage device according to claim 9, wherein the calculation section is further configured to calculate the indices of the write speed based on a presence or absence of the physical addresses corresponding to the candidate addresses.

11. The non-volatile storage device according to claim 1, wherein the communication section is further configured to perform data communication with the host device that accesses the storage section, and the calculation section is further configured to notify the host device with the candidate addresses, via the communication section.

12. The non-volatile storage device according to claim 1, wherein the calculation section is further configured to:

generate notification information about a range of the candidate addresses, and notify the host device of the generated notification information.

13. The non-volatile storage device according to claim 12, wherein the notification information includes at least one of:

a head address of the range of the candidate addresses, a size of data that is writable into the range of the candidate addresses, or an index associated with a write speed, wherein the write speed indicates a speed at a time when the write data is written to the candidate addresses.

14. A host device to access a non-volatile storage device, the host device comprising:

a generating section configured to calculate a data size associated with write data;

a first communication section configured to:

perform data communication to access a storage section of the non-volatile storage device; and transmit the calculated data size to the non-volatile storage device, wherein the non-volatile storage device includes:

the storage section including a plurality of block sections, wherein each of the plurality of block sections includes a plurality of page sections, data is independently writable into each of the plurality of page sections, and the data written in the plurality of page sections is collectively deletable in each of the plurality of block sections;

a second communication section configured to receive the calculated data size; and a calculation section configured to:

determine that the received data size is greater or smaller than a size of free space in the non-volatile storage device;

calculate a plurality of first addresses as candidate addresses based on the determination that the received data size is smaller than the size of free space, wherein the candidate addresses are candidates of logical addresses for the write data to be written into the plurality of page sections, the plurality of first addresses corresponds to unused logical addresses that have physical addresses unspecified in a conversion table, and the conversion table is a table that converts the logical addresses of the data written in the plurality of page sections to the physical addresses of the plurality of page sections; and calculate each of the plurality of first addresses and a plurality of second addresses as the candidate addresses based on the determination that the received data size is greater than the size of free space, wherein the plurality of second addresses are the logical addresses that correspond to a same block section of the plurality of block sections; and the generating section is further configured to:

acquire the candidate addresses from the non-volatile storage device via the first communication section; and generate the write data that corresponds to the acquired candidate addresses.

15. A data storage system, comprising:

a non-volatile storage device; and a host device configured to access the non-volatile storage device;

the non-volatile storage device including:
- a storage section including a plurality of block sections, wherein
  - each of the plurality of block sections includes a plurality of page sections,
  - data is independently writable into each of the plurality of page sections, and
  - the data written in the plurality of page sections is collectively deletable in each of the plurality of block sections;
- a first communication section configured to receive, from the host device, a data size associated with write data; and
- a calculation section configured to:
  - determine that the received data size is greater or smaller than a size of free space in the non-volatile storage device;
  - calculate a plurality of first addresses as candidate addresses based on the determination that the received data size is smaller than the size of free space, wherein
    - the candidate addresses are candidates of logical addresses for the write data to be written into the plurality of page sections,
    - the plurality of first addresses corresponds to unused logical addresses that have physical addresses unspecified in a conversion table, and
    - the conversion table is a table that converts the logical addresses of the data written in the plurality of page sections to the physical addresses of the plurality of page sections; and
  - calculate each of the plurality of first addresses and a plurality of second addresses as the candidate addresses based on the determination that the received data size is greater than the size of free space, wherein
    - the plurality of second addresses are the logical addresses that correspond to a same block section of the plurality of block sections;

the host device including:
- a second communication section configured to perform data communication to access the storage section of the non-volatile storage device; and
- a generating section configured to:
  - acquire the candidate addresses from the non-volatile storage device via the second communication section, and
  - generate the write data corresponding to the acquired candidate addresses.

\* \* \* \* \*